(12) United States Patent
Visa et al.

(10) Patent No.: US 8,089,915 B2
(45) Date of Patent: Jan. 3, 2012

(54) SYNCHRONOUS DATA TRANSMISSIONS BY RELAY NODE

(75) Inventors: Pierre Visa, Rennes (FR); Laurent Frouin, Rennes (FR); Arnaud Closset, Cesson-Sévigné (FR); Yacine El Kolli, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 776 days.

(21) Appl. No.: 12/164,759

(22) Filed: Jun. 30, 2008

(65) Prior Publication Data

US 2009/0016257 A1    Jan. 15, 2009

(30) Foreign Application Priority Data

Jul. 11, 2007 (FR) ..................................... 07 56429

(51) Int. Cl.
*H04B 7/14* (2006.01)
(52) U.S. Cl. ...................................................... 370/315
(58) Field of Classification Search ........................ None
See application file for complete search history.

(56) References Cited

U.S. PATENT DOCUMENTS

| | | | | |
|---|---|---|---|---|
| 6,345,375 B1 * | 2/2002 | Kelkar et al. | ................. | 714/748 |
| 6,865,163 B1 * | 3/2005 | Bergenwall et al. | ............ | 370/288 |
| 6,891,797 B1 | 5/2005 | Frouin | .......................... | 370/230 |
| 7,075,937 B1 | 7/2006 | El Kolli | ................... | 370/395.65 |
| 7,099,322 B1 | 8/2006 | Frouin et al. | .................. | 370/390 |
| 7,920,501 B2 * | 4/2011 | Larsson et al. | ................ | 370/315 |
| 2003/0023915 A1 * | 1/2003 | Choi | ............................ | 714/748 |
| 2005/0050432 A1 * | 3/2005 | Chen et al. | ..................... | 714/776 |
| 2005/0078671 A1 | 4/2005 | Bizet et al. | ..................... | 370/389 |
| 2007/0201364 A1 * | 8/2007 | Nakajima et al. | ............. | 370/230 |
| 2008/0108303 A1 * | 5/2008 | Okuda | ............................. | 455/7 |
| 2008/0133996 A1 * | 6/2008 | Naka et al. | ..................... | 714/748 |
| 2008/0186898 A1 * | 8/2008 | Petite | ............................ | 370/315 |
| 2008/0317017 A1 * | 12/2008 | Wiemann et al. | ............. | 370/389 |
| 2009/0016290 A1 * | 1/2009 | Chion et al. | ................... | 370/329 |
| 2009/0141668 A1 * | 6/2009 | Zhang et al. | ................... | 370/315 |
| 2009/0268701 A1 * | 10/2009 | Welborn et al. | ............... | 370/336 |
| 2010/0008342 A1 * | 1/2010 | Nishida et al. | ................ | 370/338 |

* cited by examiner

*Primary Examiner* — Anh-Vu Ly
(74) *Attorney, Agent, or Firm* — Fitzpatrick, Cella, Harper & Scinto

(57) ABSTRACT

A method of transmitting data in a synchronous communications network, which includes multiple nodes, includes communicating a super frame that includes multiple frames, based on a network cycle, each frame being associated with one of the nodes. Each frame includes a payload that includes an own data section and a repeat data section. The nodes include at least one relay node associated with an application generating own data of the relay node to be transmitted to at least one second node. The relay node receives frames from other of the nodes, reads a predetermined part of data from the received frames, which enables repeat data to be obtained, writes the repeat data in the repeat data section of a new frame, writes the own data of the relay node in the own data section of the new frame, and transmits the new frame.

21 Claims, 15 Drawing Sheets

| | Own data | Repeat data |
|---|---|---|
| Node 0 | Chunk[0..18] | Empty |
| Node 1 | Chunk[19] | Chunk[20,23] (t-1) |
| Node 2 | Chunk[20] | Chunk[24,25] (t-1)<br>Chunk[0,2] (t) |
| Node 3 | Chunk[21] | Chunk[1,3,5,7] (t) |
| Node 4 | Chunk[22] | Chunk[4,6,8,10] (t) |
| Node 5 | Chunk[23] | Chunk[9,11,13,15] (t) |
| Node 6 | Chunk[24] | Chunk[12,14,16,18] (t) |
| Node 7 | Chunk[25] | Chunk[17,19] (t) |

Figure 2b

| | Chunk 0 | ... | Chunk M |
|---|---|---|---|
| Node 0 | 0/1 | ... | 0/1 |
| Node 1 | 0/1 | ... | 0/1 |
| ... | ... | ... | ... |
| Node N | 0/1 | ... | 0/1 |

Figure 6

SYNCHRONOUS DATA TRANSMISSIONS BY RELAY NODE

1. FIELD OF THE INVENTION

The field of the invention is that of data transmission in synchronous meshed networks.

The invention can be applied especially but not exclusively to data transmission in a 60 GHz wireless (radio) transmission system. 60 GHz radio transmission systems are particularly well suited to short-distance data transmission at very high bit rates. For example, such a transmission system is well suited to connectivity between the different elements of a "home cinema". In this case of use, the range of the transmission is limited to about ten meters but the bit rates brought into play are very high, sometimes over one gigabit per second because of the nature of the information transmitted (both audio and video information) and the high resolution of this information. In order to limit the power needed for data transmission in a 60 GHz system, it is preferable to use electronically steerable antennas. These antennas are formed by electromagnetic point matrices activated so as to define an angle (orientation) of data transmission and/or reception. In a communications network of this kind, it is necessary to be able to simultaneously support several concurrent audiovisual applications synchronously.

Such a network is for example:
- a "home cinema" network with wireless speakers (point-to-multipoint type network);
- a network based on multiple video sources connected to a display device (multipoint-to-point type network).
- a network based on multiple video sources connected to multiple display devices (multipoint-to-multipoint type network).

In a synchronous meshed network, there is a predetermined sequence of time intervals at the MAC (medium access control) layer. It may be recalled that the MAC layer manages access to the physical medium and is a part of the data link level corresponding to layer 2 of the OSI model. Each node can send data during time intervals or hops that are allocated to it. During each hop, the data is sent in a frame of fixed size, here below called a MAC frame (or packet). In other words, a synchronous meshed network applies a clocking that defines a network cycle for data transmission on this network. A super frame forms part of each network cycle and includes a plurality of frames, each frame being associated with one of the nodes.

To preserve the synchronous character of such a synchronous network, it is therefore necessary to have a fixed time limit for the transmission of the data.

Furthermore, there are many cases in which the meshed network is not 100% reliable. This is the case especially but not exclusively with wireless networks in which the transmission is subject to interference and shadowing and is therefore not reliable.

The present invention relates specifically to improving the reliability of exchanges at the data link level on a synchronous wireless meshed network.

2. PRIOR ART

There are three known generic techniques for improving the reliability of transmission in a meshed network.

In a first known technique, called the ARQ ("Automatic Repeat Request") technique, the receiver automatically asks the sender for retransmission if it detects errors or a missing packet. This first known technique (ARQ) therefore introduces solely temporal diversity (same data sent at different points in time). This technique is therefore worthwhile if the transmission conditions between the sender and the receiver are not the same at different points in time.

Unfortunately, it cannot be applied to a synchronous meshed network since the transfer time is not constant (it is all the greater as the number of retransmissions increases). For example, the transfer time is T if there is no transmission error, T+n if there are errors requiring retransmission, and T+k*n if there are errors on k−1 retransmissions.

Furthermore, this first prior art technique (ARQ) does not introduce any spatial diversity since it is the same transmitter which initially transmits and then retransmits if necessary. It is therefore not efficient against shadowing from an immobile or slow-moving obstacle, i.e. if the conditions of transmission between the sender and the receiver remain the same at different points in time.

Finally, this first known technique (ARQ) has the drawback of introducing an overhead into the network, due to the sending of retransmission requests and corresponding acknowledgements as well as the orientation of the antennas for the reception of these acknowledgements of reception.

In a second known technique, called a systematic retransmission technique, the sender retransmits each packet systematically.

This second known technique has the advantage, as compared with the first known technique (ARQ), of being able to the applied to a synchronous meshed network since it enables a constant transfer time.

However, like the first known technique (ARQ) it introduces only temporal diversity and not spatial diversity since it is the same transmitter that initially transmits and then re-transmits systematically. Hence, it too is not efficient against shadowing from any immobile or slow-moving obstacle, i.e. where the conditions of transmission between the sender and the receiver remain the same at different points in time.

In a third known technique, called a systematic data relay technique, a node plays the role of a relay in using certain of the time intervals or hops that are allocated to it to retransmit data that it has received beforehand. In other words, among the frames that the relay node sends, certain contain only data of the relay node, and others contain only retransmission data.

This third known technique has the advantage, as compared with the first known technique (ARQ), of being capable of being applied to synchronous meshed networks since it provides for constant transfer time.

Furthermore, it introduces dual diversity: temporal and spatial diversity (same data sent at different points in time and by different nodes).

However, it is not optimal because, during a time interval in which the relay node retransmits data, it is not capable of transmitting its own data. The relay node is therefore less reactive. Furthermore, in a given network cycle, the relay node can only transmit data received in the previous network cycle, thus increasing the latency of the network in reception.

3. GOALS OF THE INVENTION

The invention, in at least one embodiment, is aimed especially at overcoming these different drawbacks of the prior art.

More specifically, in at least one embodiment of the invention, one goal is to provide a technique of data transmission in synchronous communications network enabling the improvement of the reliability of the transmission (in the event of interference and/or shadowing) while at the same time preserving the synchronous nature of the network.

At least one embodiment of the invention is also aimed at providing a technique of this kind to optimize the latency of the network in reception.

Another goal of at least one embodiment of the invention is to provide a technique of this kind that can be implemented in a simple way and works automatically.

4. SUMMARY OF THE INVENTION

A particular embodiment of the invention proposes a method of data transmission in a synchronous communications network comprising a plurality of nodes, a super frame being communicated based on a network cycle on the network and comprising a plurality of frames, each frame being associated with one of said nodes. Each frame comprises a payload part itself comprising an own data section and a repeat data section. Said plurality of nodes comprises at least one relay node associated with an application generating own data of said relay node having to be transmitted to at least one destination node. The relay node performs the following steps:
  reception of frames coming from the other nodes;
  reading of a predetermined part of the data from the received frames, enabling repeat data to be obtained;
  writing said repeat data in the repeat data section of a new frame; and
  writing own data of said relay node in the own data section of said new frame; and
  transmission of said new frame.

The general principle of the invention therefore consists of a systematic re-transmission of data by at least one relay node with a frame structure used to send, in a same frame, data of the relay node (in the own data section) and re-transmission data (in the repeat data section). This provides for multiple-path transmission with a segmentation of data.

This technique makes it possible to preserve the synchronous character of the network (the transfer time is constant) while at the same time introducing a dual diversity, temporal and spatial (same data transmitted at different points in time and by different nodes), improving the reliability of the transmission (in the event of interference and/or shadowing).

It must be noted that the greater the number of relay nodes, the greater the increase in spatial diversity and temporal diversity.

As compared with the above-mentioned third known technique (systematic relaying of data without mixing of own data and retransmission data in a same frame), the technique of the invention is more reactive, a node being capable of transmitting own data at each cycle. For example, in the case of an implementation of a request/response type protocol between two nodes, the request destination node has the opportunity to respond at each cycle while at the same time fulfilling the function of spatial diversity linked to the sending off retransmission data.

Advantageously, in said reading step used to obtain repeat data, only a predetermined part of the data of the own data section of the received frames is read.

In this way, the latency is further reduced. Indeed, the data retransmitted in the new frame is not data already retransmitted by another relay node.

Advantageously, said reading step used to obtain repeat data is performed as a function of the content of a transmit matrix which indicates the content of the own data section for each node.

According to an advantageous characteristic, the own data section of each frame comprises a predetermined number of data blocks called chunks. For each node, said transmit matrix indicates for each chunk rank i, with i∈[1, M], M being the maximum number of chunks per super frame, whether:
  the rank i chunk should be transmitted in the own data section of the frame associated with said node, or
  the rank i chunk should not be transmitted in the own data section of the frame associated with said node.

Advantageously, said repeat data writing step is performed as a function of the content of a retransmit matrix which indicates the content of the repeat data section for each node.

Advantageously, the own data section of each frame comprises a predetermined number of blocks called chunks. For each node, said retransmit matrix indicates, for each chunk rank i, with i∈[1, M], M being the maximum number of chunks per super frame, whether:
  the rank i chunk should not be retransmitted in the repeat data section of the frame associated with said node, or
  the rank i chunk should be retransmitted in the repeat data section of the frame associated with said node, in taking a chunk associated with said rank i and received in a current super frame, or
  the rank i chunk must be retransmitted in the repeat data section of the frame associated with said node, in taking a chunk associated with said rank i and received in a previous super frame.

Advantageously, if a chunk to be retransmitted is missing because it has not been read during said reading step, then a padding chunk is written instead of said missing chunk in the repeat data section of the new frame.

The use of padding chunks maintains the clocking (each frame transmitted by given relay node then always contains the same number of chunks, even if certain data chunks to be retransmitted have not been received by this relay node).

Advantageously, the method comprises a step of storage of the data of the frames received in a memory and, in said read step, said repeat data is read in said memory.

In a first advantageous embodiment, each frame comprises a predetermined number of data blocks called chunks and each step of storage of the data of the received frames comprises the following steps, for each chunk of each frame:
  if said chunk is a first received copy then said chunk is stored in the memory;
  if said chunk is not a first received copy but a second copy, and if a first copy has already been received and stored, then said second copy is not stored in the memory.

In a second advantageous embodiment, each frame comprises a predetermined number of data blocks called chunks and said step of storage of the data of the received frames comprises the following steps for each chunk of each frame:
  if said chunk is a first received copy, then said chunk is stored in the memory;
  if said chunk is not a first received copy but a second copy and if a first copy has already been received and stored, then the quality of said first and second copies is compared and that one of said first and second copies having the best quality according to at least one quality criterion is stored in memory.

The second embodiment is slightly more complex than the first one. However, it can be used to improve the quality of the retransmitted chunks and hence also the quality of the error correction done at reception.

In another embodiment, the invention relates to a method of reception of data in a synchronous communications network comprising a plurality of nodes, a super frame being communicated based on a network cycle on the network and comprising a plurality of frames, each frame being associated with one of said nodes. Each frame comprises a payload part itself comprising an own data section and a repeat data section. A destination node belonging to said plurality of nodes performs the following steps:
- reception of the frames coming from the other nodes;
- reading of the first data intended for said destination node in a predetermined part of the own data section of at least one of the received frames; and
- reading of second data intended for said destination node, in a predetermined part of the repeat data section of at least one of the received frames; and
- processing of the first and second pieces of data read.

In another embodiment, the invention relates to a computer program product downloadable from a communications network and/or recorded in a computer-readable support and/or executed by a processor, said computer program product comprising program code instructions for the implementation of the above-mentioned transmission method and/or of the above-mentioned reception method when said program is executed on a computer.

In another embodiment, the invention relates to a storage means, which may be totally or partially detachable, readable by a computer, storing a set of instructions executable by said computer to implement above-mentioned transmission method and/or the above-mentioned reception method.

In another embodiment, the invention concerns a relay node belonging to a plurality of nodes included in a synchronous communications network comprising a plurality of nodes, a super frame being communicated based on a network cycle on the network and comprising a plurality of frames, each frame being associated with one of said nodes, said plurality of nodes comprising at least one first sender node associated with a first generator application generating own data of said first sender node having to be transmitted to at least one first destination node, said relay node being associated with a second generator application generating own data of said relay node having to be transmitted to at least one second destination node. Said relay node comprises:
- means of reception of frames coming from the other nodes, each frame comprising a payload part itself comprising an own data section and a repeat data section;
- means of reading a predetermined part of the data from the received frames, enabling repeat data to be obtained;
- means of writing said repeat data in the repeat data section of a new frame;
- means of writing own data of said relay node in the own data section of said new frame; and
- means of transmission of said new frame.

Advantageously, said reading means used to obtain repeat data are means for reading only a predetermined part of the data of the own data section of the received frames.

Advantageously, said reading means used to obtain repeat data comprise a transmit matrix which indicates the content of the own data section for each node.

According to an advantageous characteristic, the own data section of each frame comprises a predetermined number of data blocks called chunks and, for each node, said transmit matrix indicates, for each chunk rank i, with i∈[1, M], M being the maximum number of chunks per super frame, whether:
- the rank i chunk should be transmitted in the own data section of the frame associated with said node, or
- the rank i chunk should not be transmitted in the own data section of the frame associated with said node.

Advantageously, said repeat data writing means comprise a retransmit matrix which indicates the content of the repeat data section for each node.

Advantageously, the own data section of each frame comprises a predetermined number of blocks called chunks and, for each node, said retransmit matrix indicates, for each chunk rank i, with i∈[1, M], M being the maximum number of chunks per super frame, whether:
- the rank i chunk should not be retransmitted in the repeat data section of the frame associated with said node, or
- the rank i chunk should be retransmitted in the repeat data section of the frame associated with said node, in taking a chunk associated with said rank i and received in a current super frame, or
- the rank i chunk must be retransmitted in the repeat data section of the frame associated with said node, in taking a chunk associated with said rank i and received in a previous super frame.

Advantageously, if a chunk to be retransmitted is missing because it has not been read by said read means, then said write means write a padding chunk instead of said missing chunk in the repeat data section of the new frame.

Advantageously, said relay node comprises means of storage of the data of the frames received in a memory and said read means read said repeat data in said memory.

In a first embodiment, each frame comprises a predetermined number of data blocks called chunks and said means of storage of the data of the received frames comprise means of implementation of the following storage policy for each chunk of each frame:
- if said chunk is a first received copy then said chunk is stored in the memory;
- if said chunk is not a first received copy but a second copy, and if a first copy has already been received and stored, then said second copy is not stored in the memory.

In a second advantageous embodiment, each frame comprises a predetermined number of data blocks called chunks and said means of storage of the data of the received frames comprise means of implementation of the following storage policy, for each chunk of each frame:
- if said chunk is a first received copy, then said chunk is stored in the memory;
- if said chunk is not a first received copy but a second copy and if a first copy has already been received and stored, then the quality of said first and second copies is compared and that one of said first and second copies having the best quality according to at least one quality criterion is stored in memory.

In another embodiment, the invention relates to destination node belonging to a plurality of nodes included in a synchronous communications network, a super frame being communicated based on a network cycle and comprising a plurality of frames, each frame being associated with one of said nodes. The destination node comprises:
- means of reception of the frames coming from the other nodes, each frame comprising a payload part itself comprising an own data section and a repeat data section;
- means of reading first data intended for said destination node in a predetermined part of the own data section of at least one of the received frames;
- means of reading second data intended for said destination node, in a predetermined part of the repeat data section of at least one of the received frames; and
- means of processing said first and second pieces of data read.

LIST OF FIGURES

Other features and advantages of embodiment of the invention shall appear from the following description, given by way of an indicative and non-exhaustive example (the embodiments of the invention are not all limited to the characteristics and advantages of the embodiments described here below) and from the appended drawings of which:

FIG. 2b is an example of a retransmission scheme;

FIG. 6 shows an example of an architecture of the mux_demux register shown in FIG. 5, according to a particular embodiment of the invention;

Figure 5:
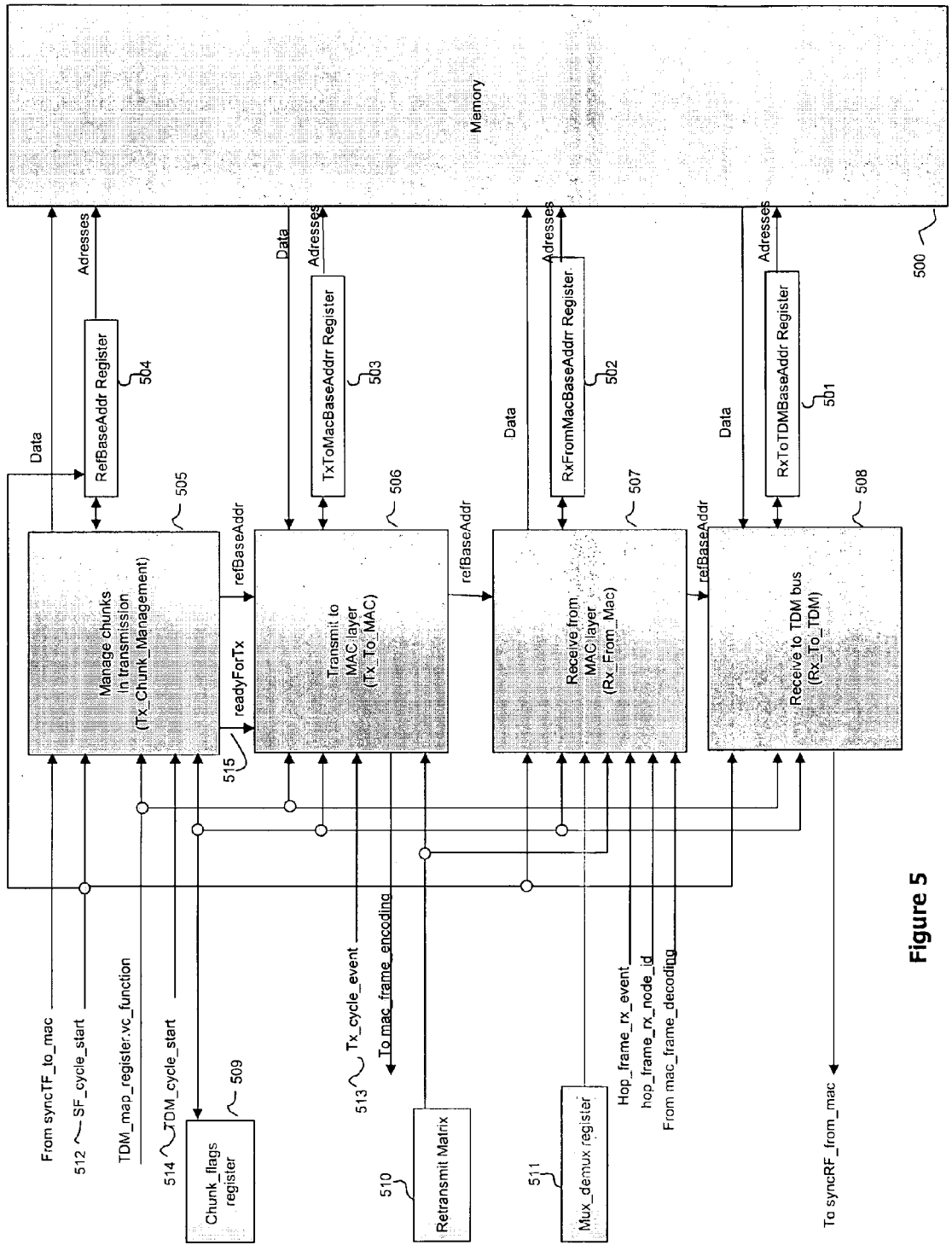
FIG. 5 shows an example of an architecture of the MAC adapter 428 shown in FIG. 4 according to a particular embodiment of the invention.
Figure 13:
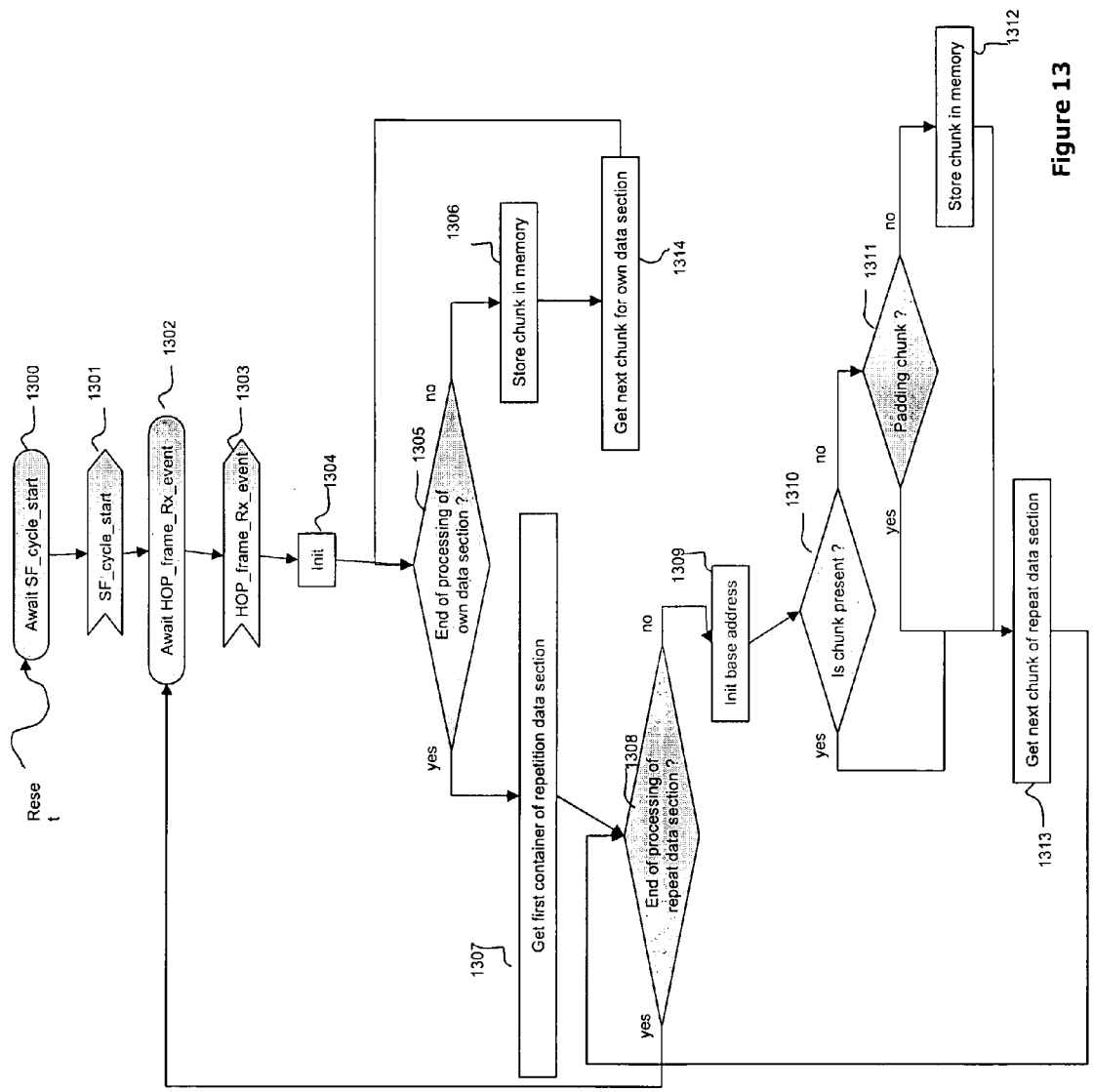
Figure 14:
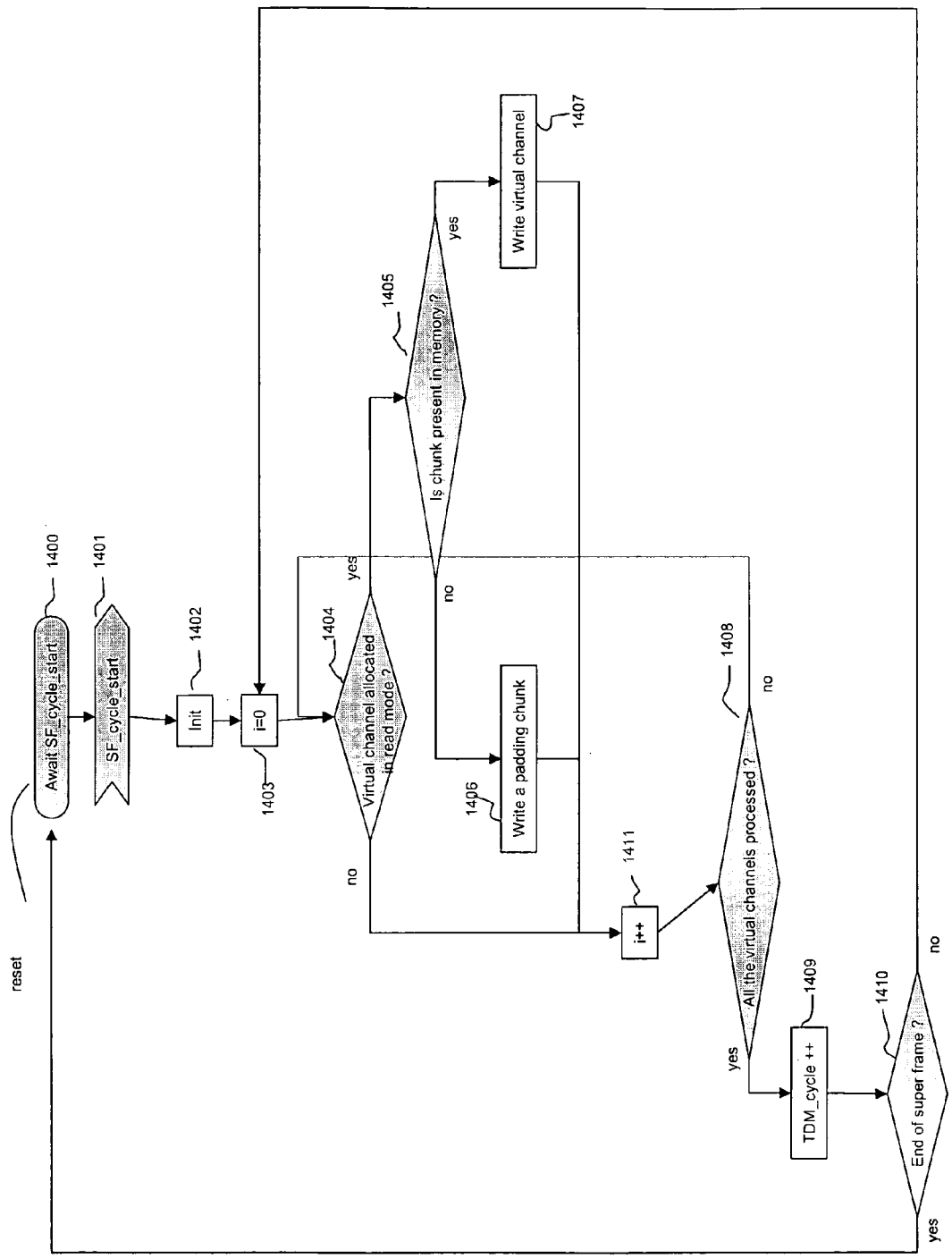

FIG. 13 shows the main steps of a processing algorithm implemented by the reception module from the MAC layer included in the MAC adapter and shown in FIG. 5, according to a particular embodiment of the invention; and FIG. 14 shows the main steps of a processing algorithm implemented by the module of reception to the TDM bus included in the MAC adapter and shown in FIG. 5, according to a particular embodiment of the invention.

6. DETAILED DESCRIPTION

In all the figures of the present document, the identical elements and steps are designated by a same numerical reference.

A particular application of the methods of transmission and reception according to a particular embodiment of the invention is placed here below in the context of a communications network 1000 which is a 5.1 type "home cinema" or "home theater" network illustrated by FIG. 1. Naturally, the invention can also be applied in the context of a 7.1 type "home cinema" network.

Naturally, the method according to at least one other embodiment of the invention can also be implemented in any communications network in which it is necessary to simultaneously implement several concurrent synchronous applications such as, for example, one of the following networks:

a network based on multiple media sources connected to a display device (multipoint-to-point type network);

a network based on multiple media sources connected to multiple display devices (multipoint-to-multipoint type network).

In the context of the 5.1 home cinema network 1000, the speakers are connected to the audio source by means of a meshed wireless network 101.

The 5.1 home cinema network 1000 comprises an audio-video source terminal 102 (for example a DVD reader), a television screen 103, a first speaker 104, called a center speaker 104, a second speaker 105, called a subwoofer 105, a third speaker 106, called a front-left speaker 106, a fourth speaker 107, called a front-right speaker 107, a fifth speaker 108, called a right ambience speaker 108 and a sixth speaker 109, called a left ambience speaker 109. Each speaker plays one of the six audio channels delivered by the source terminal 102.

In order to make the meshed wireless network 101, the invention uses a wireless ambience controller 110 here below called a WSC ("Wireless Surround Controller") node 110 and first, second, third, fourth, fifth and sixth active wireless nodes 111, hereinafter called WAS nodes (for "Wireless Active Speaker") 111, each being associated with one of the above-mentioned speakers.

The function of a WAS node 111 is to set up an interface between the speaker with which it is associated and the WSC node 110 in the wireless meshed node 101. Each WAS node 111 is connected to the speaker with which it is associated by a coaxial cable 116. For a given WAS node 111, depending on the location of the amplifier and of the digital/analog converters (in the WAS node or in the speaker), the cable 116 conveys digital or analog audio signals.

Figure 1:
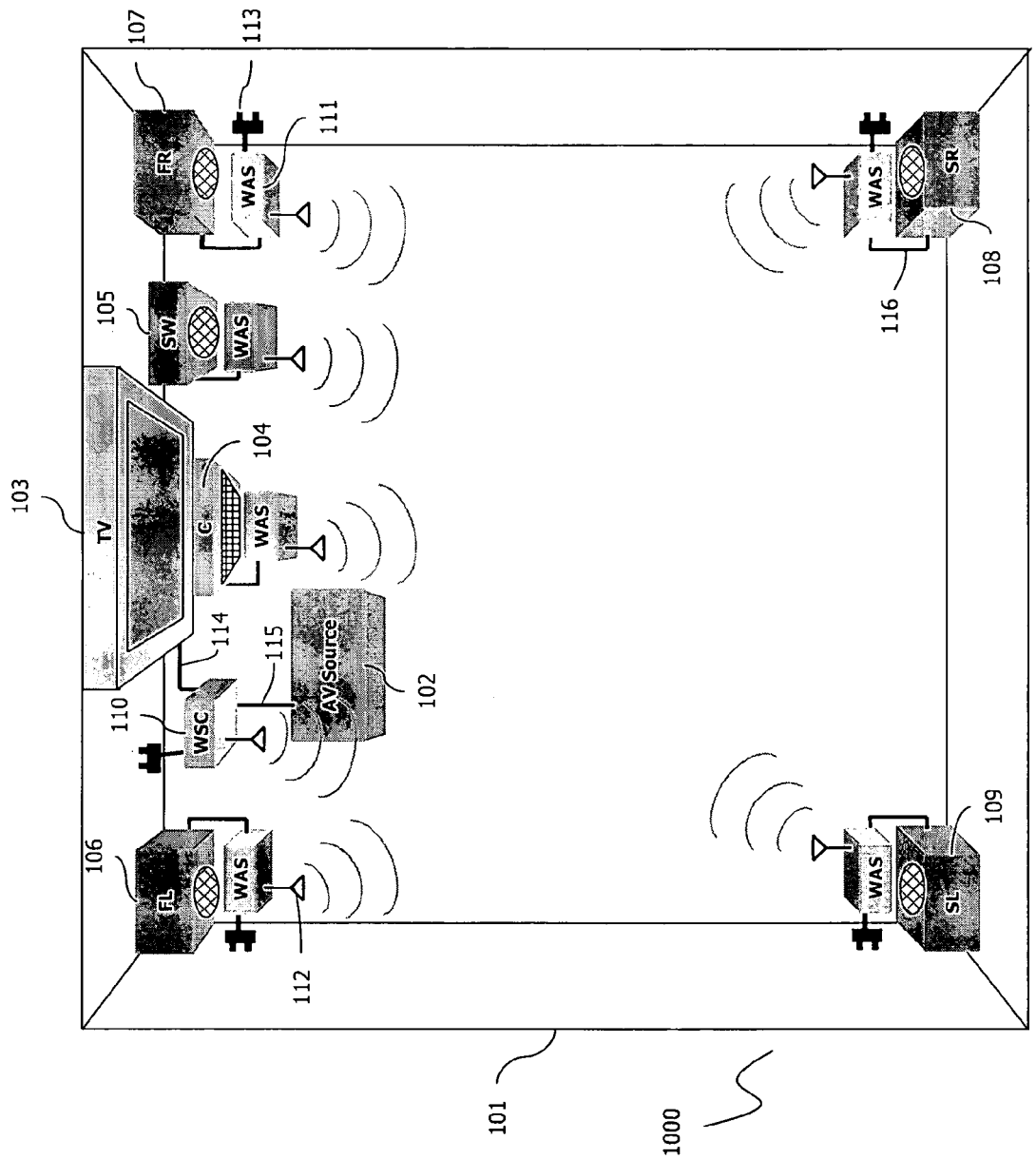
FIG. 1 is a drawing of a communications network in which it is possible to implement methods of transmission and reception according to a particular embodiment of the invention.

The WAS node 111 and the WSC node 110 are each powered by a power connector 113 (this power connector is not represented for each of the nodes 110, 111 in FIG. 1) and each of them comprises one antenna 112 in order to implement wireless communications. The antenna 112 is preferably an electronically steerable electromagnetic antenna.

The WSC node 110 receives audio-video streams transmitted by the audio-video source terminal 102 through a cable 115. Then, through a wireless communication, it transmits digital video data coming from the received audio-video streams to all the speakers and, through a cable 114, it transmits digital video data from the received audio-video streams to the television screen 103. For example, the cables 114 and 115 are HDMI ("High Definition Multimedia Interface") protocol compliant cables. The source terminal 102 or the WSC node 110 comprise an audio channel decoder in order to identify and separate the audio data samples of each channel. Furthermore, they include an ambience processor to apply modifications to the audio samples as a function of the acoustic characteristics of the room.

In order to improve the compactness of the system, the WSC node 110 may be integrated into the source terminal 102 and each WAS node 111 may be integrated into the speaker with which it is associated.

In the present network 1000, the following time constraints are critical:

the relative time lag between the audio signal and the video signal coming from a same audio-video content must be minimized:

the relative time lag between transmission from the different speakers (between the audio channels) must be minimized.

The relative time shift between the audio signal and the video signal coming from a same audio-video content, generally called "lip synchronization", must be minimized. For user comfort, the relative time lag between the audio signal and the video signal must remain within the interval ranging from −30 ms to +100 ms. In the case of wireless connections, the radio transmitters/receivers add time lags due to transmission. The audio signal is thus offset relative to the video signal. If this offset becomes greater than hundred milliseconds, then it is necessary to delay the video signal at output of the source terminal 102.

In the home cinema network 100, the distance between the listening stations for the user and the speaker generally varies according to the speaker considered. Owing to the speed of propagation of sound in the air (approximately 343 m/s), the time of propagation of the sound wave from the speaker to the listening station is different for each audio channel. For example, a difference in propagation path of 34 cm between two audio channels implies a time lag of one ms at reception between the two audio channels. Thus, in order to preserve acceptable relative time lags (i.e. shorter than 100 μs), most of the home cinema systems implement a mechanism of automatic compensation for these time lags.

At the installation of the meshed network 101, particular attention must be paid to compliance with time constraints. The present invention ensures that the transmission time in the network is fixed. Furthermore, in the context of the network 1000, compensation for time lags due to the effects of distance is obtained at output of the WAS 111.

Thus, each WAS node 111 simultaneously delivers an audio sample at its consumer (receiver) application layer, this audio sample coming from a generator (or sender) application of the WSC 110 after a delay that is fixed and common to the WAS nodes. The compensation for the time lags due to the effects of distance is achieved in each WAS node before entry into the amplification stage.

In the network 1000 of this FIG. 1, a 1 to N (N=6) type communication (i.e. point-to-multipoint type communication) is made from the WSC node 110 to the six WAS nodes 111. Advantageously, the WSC node and the WAS node are each capable of sending (or transmitting) and receiving data thus enabling N to N, i.e. multipoint-to-multipoint type communications to be set up.

The transmission and reception methods according to the invention (described in greater detail with reference to FIGS. 2*a* and 11 to 14) are implemented in the form of a software program and/or a plurality of software sub-programs (comprising a plurality of algorithms described here below) which is/are executed in several machines of the network 1000, for example in the WSC node 110 and in the WAS nodes 111.

Figure 2A:
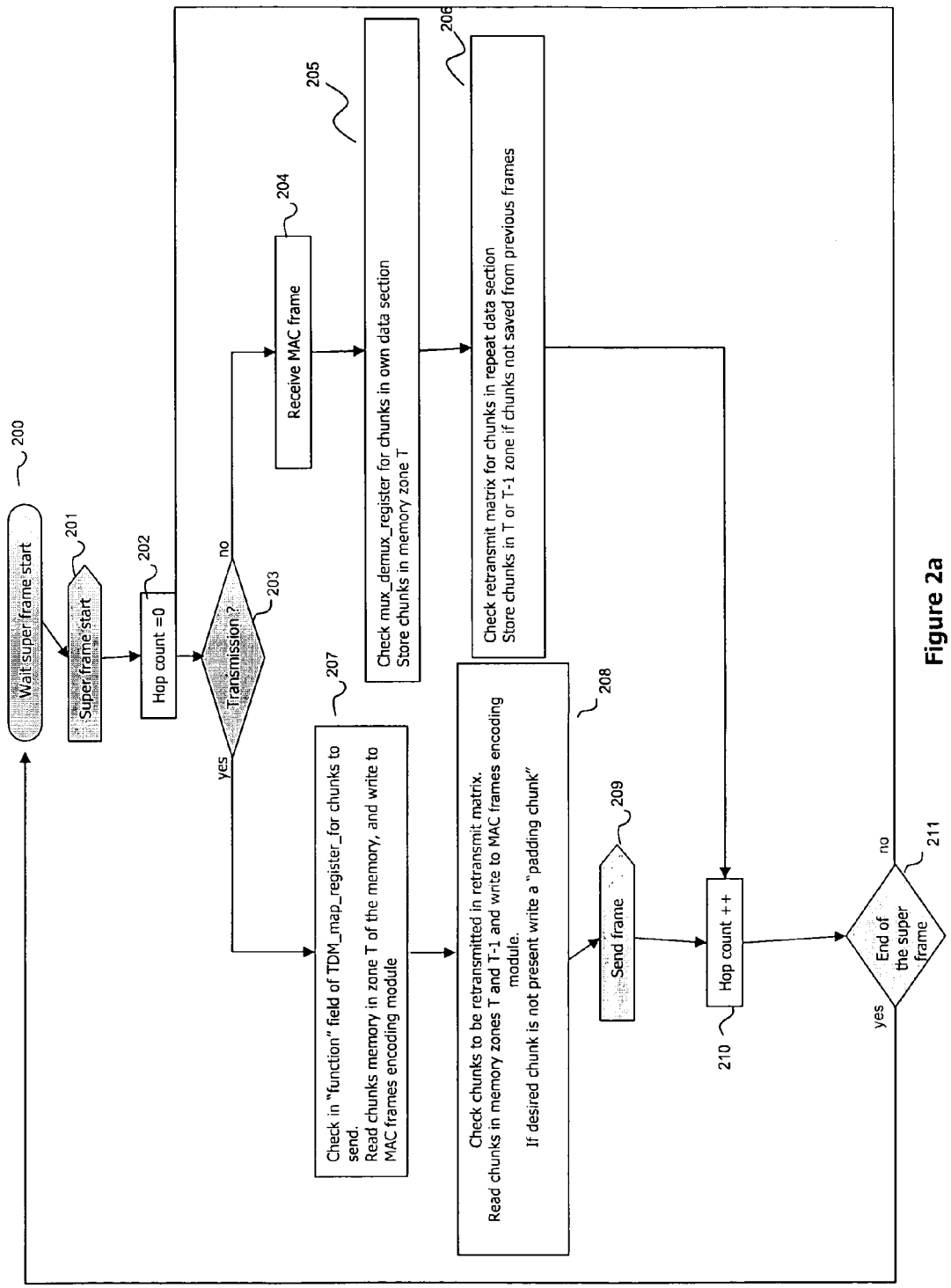
FIG. 2a is a flowchart of a particular embodiment of the method of transmission according to the invention.

FIG. 2*a* presents a generic algorithm illustrating a particular embodiment of the invention. This algorithm illustrates the steps performed in order to send and receive MAC (medium access controller) frames during a super frame 300. The structure of a super frame is described here below with reference to FIG. 3.

In an initial step 200, the start of a super frame is awaited. After reception of a super frame start signal (step 201) the intermediate value of the frame counter (or "Hop count intermediate value") is set at zero (step 202). This intermediate value will count the different frames of the super frame.

In a test step 203, it is decided whether it is the turn of the above-mentioned machine or machines to send a frame or to receive one.

If it is the turn of the above-mentioned machine or machines to receive, then a MAC frame 301 is received from a given node (step 204) and the operation passes to a step 205 for processing the own data section of the MAC frame. To this end, a check is made in the mux_demux register 511 (described with reference to FIG. 6) to find out which are the chunk numbers or identifiers corresponding to the data transmitted by this given node in its own data section. With the chunk numbers being known, these chunks are stored in the zone T of the memory (an example of an architecture of the memory is described with reference to FIG. 10). The zone T corresponds to the current super frame while the zone T−1 corresponds to the preceding super frame.

Then, in the step 206, the repeat data section of the MAC frame, also called a retransmission data section or again a relay data section is processed. The processing consists in consulting the retransmit matrix 510 to obtain the chunk numbers corresponding to the repeat data section of this given node and the storage of these chunk numbers in the zone T or T−1 of the memory, as a function of the values of the matrix.

The operation then passes to the step 210 in which the frame counter is incremented.

Returning to the above-mentioned test step 203, if it is our turn to send, the operation passes to the step 207 during which the own data section of the MAC frame to be sent is built. To this end, a check is made in the "function" field 801 of the TDM_MAP register to find out the virtual channels allocated to the local node for the write mode. Thus, the chunk numbers to be consulted in the memory in the zone T (current super frame) are obtained. These chunks are written to the MAC frame encoding module 424 and the operation passes to the step 208.

In the step 208, the repeat data section of the MAC frame to be sent is built. To this end, a check is made in the matrix 510 to find out which chunks are allocated to the local node for retransmission and to find out whether these chunks belong to the current super frame or to the preceding super frame. After these chunks have been found in the memory, they are added to the MAC frame encoding module 424.

In the step 209, the MAC frame is sent and then in the step 210, the frame counter is incremented.

In the step 211, which follows the step 210, a test is made to find out if the end of the super frame has been reached. If the answer is yes, the operation returns to the step 200. If the answer is negative, the operation returns to the step 203.

FIG. 2*b* is an example of a retransmission scheme. The table 250 defines the own data section 251 and the repeat data section 252 for each node.

Thus, in this example, the node 0 (referenced 253) sends the chunks 0 to 18 as its own data, and will not repeat any data. The node 2 (referenced 254) will send the chunk numbered 20 as its own data, the chunks 0 to 2 of the current super frame as part of its repeat data and the chunks 24 and 25 of the preceding super frame also as part of its repeat data.

To implement this example, the mux_demux register and the retransmit matrix must be filled accordingly. It is necessary only to watch over, when retransmitting chunks of the current super frame, that there is the possibility of receiving them beforehand. For example, the chunk 23 cannot be retransmitted by the node 4 in the same super frame since it is transmitted by the node 5, i.e. after the frame of the node 4.

Figure 3:
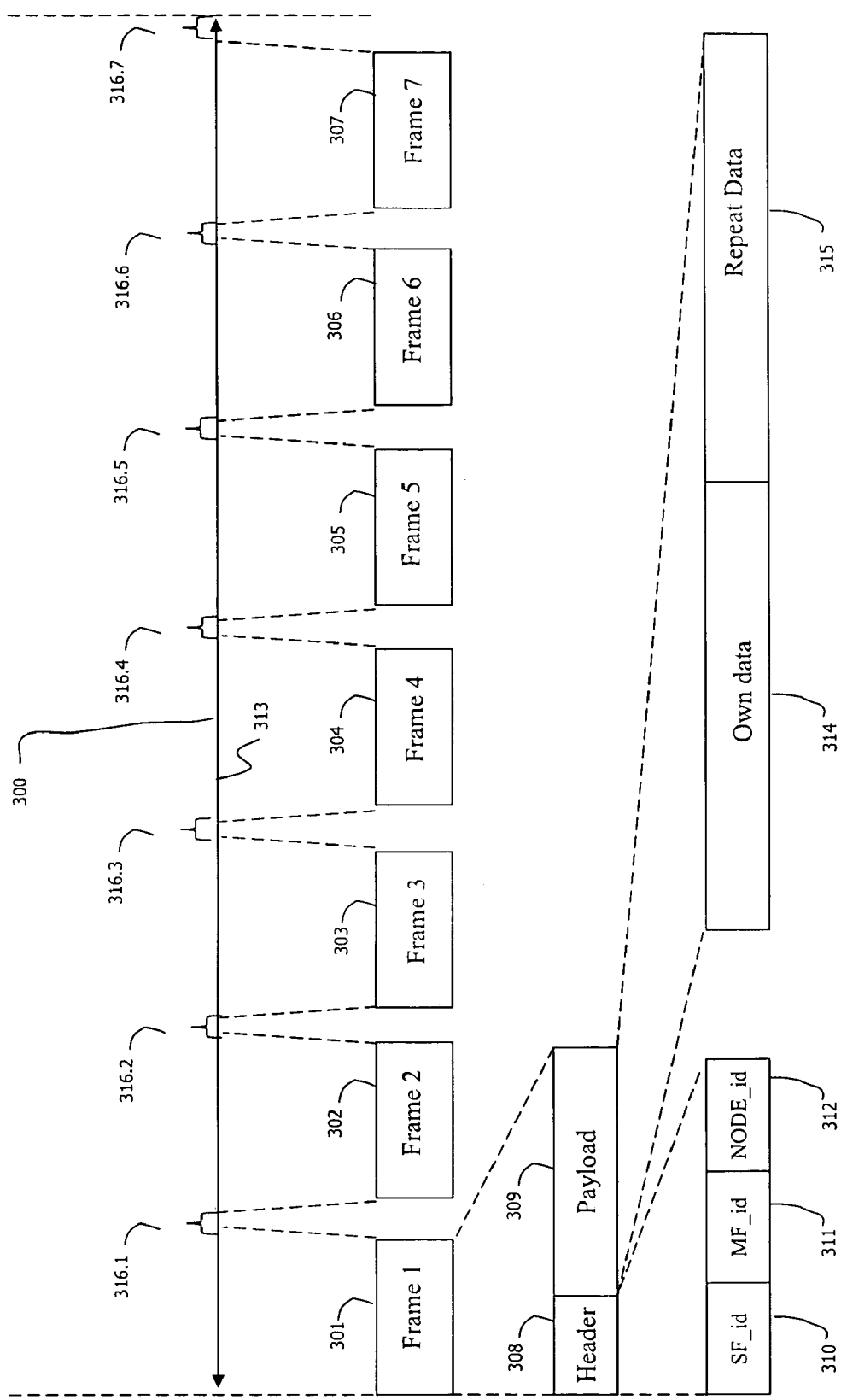
FIG. 3 is a drawing of a transmission cycle of the wireless meshed network of FIG. 1, according to a particular embodiment of the invention.

FIG. 3 is a drawing of a network cycle 313 of transmission in the wireless meshed network 101.

The super frame 300 forms part of a network cycle 313 of fixed duration, for example a duration of 1 ms. During this period, each WSC or WAS node of the network 101, during its speech time, sends its MAC frame in the wireless meshed network 101 in a predefined sending sequence. Thus, the frame 1 is sent by the WSC node 110 and the second (frame 2) to seventh (frame 7) frames are sent respectively by the first to sixth WAS nodes. These first to seventh MAC nodes form the super frame 300.

The first frame (frame 1) in the super frame 300 corresponds to the sending of the MAC frame from the master node which is the WSC node 110. This frame is called the starting frame (or "head_hop"). The nodes WAS1 to WAS6 are slave nodes. Indeed, the WSC node 110 is the node of the network that clocks the meshed network 101 and defines the cycles of the meshed network in generating the network cycle start signal 203.

Each MAC frame has a MAC header 308 and a payload data field 309. The MAC header 308 has three fields:
- the <<SF_id>> field 310 which identifies the super frame 300 and indicates the allocation of the frames 301 to 307 to the nodes of the network. For example, a first super frame can allocate the frame 1 to the node 1, the frame 2 to the node 2, the frame 3 to the node 3, the frame 4 to the node 4, the frame 5 to the node, the frame 6 to the node 6 and the frame seven to the node 7, while a second super frame will have a different allocation, for example the frame 1 allocated to the node 4, the frame 2 allocated to the node 1, the frame 3 allocated to the node 3, the frame 4 allocated to the node 1, the frame 6 allocated to the node 6 and the frame 7 allocated to the node 5;
- the "MF_id" field 311 which identifies the MAC frame in the sequence of frames in the super frame;
- the "NODE_id" field 312 which comprises an identifier of the node which sends the MAC frame.

The payload data field 309 has two sections of predetermined lengths.
- an own data section 314 reserved for the sending of own data to the node which sends; and
- a repeat data section 315, reserved for relaying data (retransmission of data transmitted originally by other nodes).

The node that sends will place previously received data that is to be relayed in this section 315.

Preferably, waiting times between the frames referenced "inter_frames 316.1 to 316.7" are provided between the frames Frame 1 to Frame 7 in order to absorb the jitter generated by the different nodes of the network and in order to enable switching over between the sending mode and the reception mode or enable the reorientation of the antennas.

Figure 4:
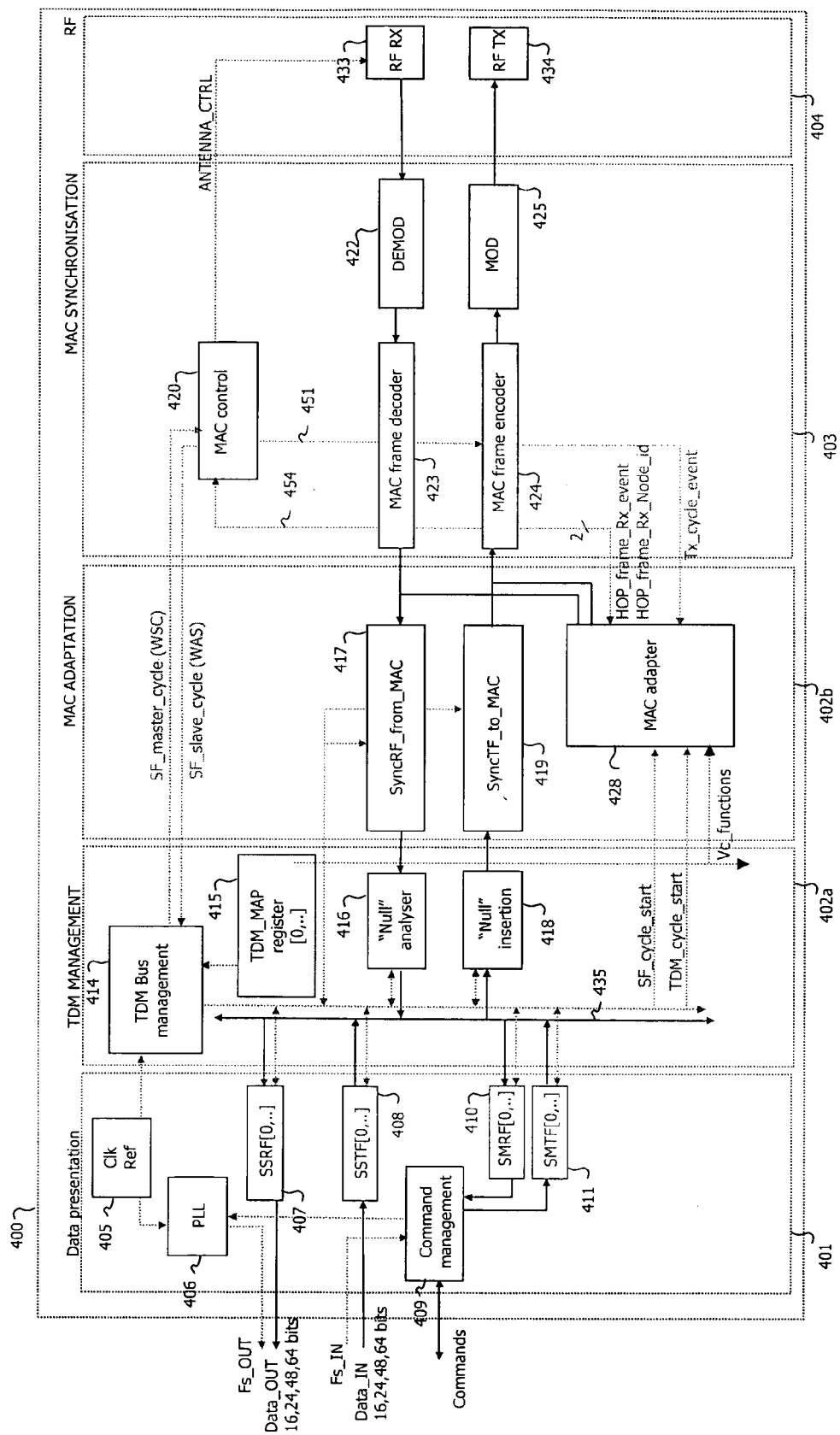
FIG. 4 is a drawing of a generic node of the wireless meshed network according to a particular embodiment of the invention.

FIG. 4 is the drawing of a generic node 400 of the wireless meshed network 101 according to the particular embodiment of the invention. For example, each of the WSC nodes and WAS nodes of the wireless meshed network 101 is identical to the generic node 400.

The generic node 400 comprises the following five modules:
- a data presentation module 401 responsible for obtaining data from a data transmitting (or generating) module and providing or presenting data to a data receiving (or consuming) module;
- a TDM manager module 402a responsible for implementing a TDM type time-division multiplexing within the node of the mesh network 101 (this module 402a is used as a transportation layer by the data presentation module 401);
- a MAC adaptation module 402b enabling the implementation of the wireless mesh network 101 and carrying out the adaptation between the arrangement in the form of virtual channels of the TDM manager module 402a and the arrangement in the form of MAC frames of a MAC synchronization module 403 described here below; The MAC adaptation module 402b is also in charge of data retransmission.
- the MAC synchronization module 403 which implements the medium access protocol MAC. It is in charge of error correction of the FEC (forward error correction) type and synchronization of access to the media. In the case of a slave node, it gives the timing synchronization to the TDM manager module 402a. It also carries out the modulation and demodulation of data addressed to or coming from a radio module 404 described here below;
- the radio module 404 is the analog part of the access to the medium. It is adapted to communication (transmission/reception) by means of millimeter waves.

The pieces of data coming from the transmit (or generator) module are stored in a set of synchronous stream transmit FIFOs (SSTF) 408 by transmitter (or generator) application at a frequency referenced Fs_IN.

The data addressed to the receiver application is stored in a set of SSRFs (Synchronous Stream Receive FIFOs) 407 by a TDM bus manager 414. These pieces of data are read by the receiver application at a frequency referenced Fs_OUT.

The application can send and receive control commands by means of a command manager interface 409 and a set of transmit/receive FIFOs comprising a set of "Synchronous Message Receive FIFOs" (SMRF) 410 and a set of Synchronous Message Transmit FIFOs (SMTF) 411. The messages are sent and received in using reserved TDM virtual channels for this purpose.

The generic node 400 comprises a reference clock 405 used by the TDM bus manager 414 to define the TDM cycles and the network cycles. This reference clock is also used by a phase-locked loop (PLL) 406 to generate the frequency Fs_OUT.

The configuration of the phase-locked loop (or PLL) 406 for the generation of the frequency Fs_OUT is achieved by the command management interface 409. At input of the generic node 400, the command management interface 409 detects and transmits the value of the frequency Fs_IN through the synchronous message transmission FIFO 411. In a distant node (i.e. distant relative to the node 400), the command management interface of this distant node receives this value of the frequency Fs_IN through the synchronous messages receive FIFO of this distant node. Thus the distant node can configure its phase-locked looped in order to deliver the same frequency value.

The TDM bus manager 414 controls a data bus 435 which connects the following FIFOs, the SSRF 407, the SSTF 408, the SMRF 410, the SMTF 411, a "null" values analyzer device 414 and a "null" values insertion device 418. The TDM bus manager 414 distributes the application data on TDM virtual channels. This distribution is defined by the already mentioned TDM map register TDM_MAP 415.

At each TDM cycle, the TDM bus manager 414 requests the null inserter device 418 to read the data of the transmitter application either from the SSTF FIFO 408 or from the SMTF FIFO 411 for all the virtual channels allocated in write mode. It can happen that there are no sufficient data in the SSTF and SMTF FIFOs to satisfy all the allocated virtual channels. In this case, the null inserter device 418 adds "null" symbols so as to fill the write-allocated virtual channels for which a quantity of data is missing. The "null" symbols are inserted to ensure that the TDM bus manager 414 will always send the same sequence of virtual channels, i.e. the same quantity of data at each network cycle, thus providing for the synchronization of the sender and receiver applications in using strictly the same sequence of virtual channels at each cycle and stop Furthermore, at each TDM cycle, the manager of the TDM bus 414 requests the null analyzer device 416 to obtain the TDM data from a SyncRF_from_MAC FIFO 417. These pieces of data are written either to the SSRF 407 or to the SMRF 410 using the TDM map register TDM_MAP 415.

Certain virtual channels convey TDM data streams having "null" symbols. The null analyzer device 416 processes the "null" symbols in such a way that they cannot be interpreted by the TDM bus manager 414 as application data. Since the "null" symbols have been inserted by the null inserter device 418, they should not be communicated to the receiver (or consumer) application. The corresponding virtual channel allocated in read mode is then left empty. The "null" symbols are used to ensure that a same quantity of data is sent by the generic node 400 at each network cycle, i.e. the MAC frame which it generates has a fixed size from one network cycle to another, whatever the bit rate of the transmitter (or generator) application. Furthermore, the receiver (consumer) application retrieves the data at the frequency Fs_OUT which corresponds to the frequency Fs_IN used by the transmitter (or generator) application to clock the transmission (or generation) of the data as described here above. The "null" symbols are not transmitted to the receiver (or consumer) application so that it no longer receives data that the transmitter application had sent and thus prevents any time lag in the reception of data and prevent the overflow of the SSRF FIFO 407. The "null" symbols thus ensure that a piece of data would be presented in the same virtual channel as the one that had been used on the transmit node, a certain number of TDM cycles earlier, to send out this same piece of data.

A MAC adapter 428 included in the "MAC" adaptation module 402b obtains at each TDM cycle:
TDM frames (data from the write-allocated virtual channels)
repeat data from the MAC adapter module 428.

Then it arranges the TDM virtual channels (i.e. the data from the above-mentioned TDM frames) and the above-mentioned repeat data in chunks which form data blocks as described here below with reference to FIGS. 11 and 12. The MAC adapter 428 knows the allocation of the virtual channels used in write mode (as well as in read mode) by access to the TDM distribution register TDM_MAP 415.

Once built, these chunks are transmitted to an encoding module 424 in the form of MAC frames during the reception of a signal referenced Tx_cycle_event 451 (indicating the start of the speech time of the generic node 400) delivered by a MAC controller 420. These chunks then constitute the payload data 309 of the MAC frame sent by the generic node 400.

In parallel, the encoding module 424 assigns predefined values to the fields SF_id 310, MF_id 311 and NODE_id 312 once the signal Tx_cycle_event 451 is active.

Then advantageously, a FEC (<<Forward Error Correction>>) type correction can be made on the MAC frame by the encoding module 424 before the MAC frame is transmitted to a MAC frame modulator 425.

Reciprocally, once a MAC frame is received by a MAC frame demodulator 422, it is transmitted to a MAC frame decoder 423 which can implement a FEC type correction.

If the header of the MAC frame is correct, a copy referenced HOP_frame_Rx_hop_id of the MF_id 311 field of the MAC header 308 is sent to the MAC controller 420 at the same time as a signal referenced HOP_frame_Rx_event is activated. This information is then used to synchronize the access control.

In parallel, a copy referenced HOP_frame_Rx_event of the field SF_id 310 and a copy referenced HOP_frame_Rx_Node_id of the field NODE_id 312 of the MAC header 308 are sent to the MAC adapter 428 which reads the data blocks in the payload data field 309 of the MAC frame delivered by the MAC frame decoder 423 and stores them in a memory.

The MAC adapter 428 receives the data coming from the MAC frame decoder 423 in chunk form. The pieces of data from the own data section and from the repeat data section of the MAC frame are analyzed by the MAC adapter module 428 in order to extract the TDM frames to be injected into the SyncRF_from_MAC FIFO 417 in complying with the order in which these pieces of data must be presented in the bus 435, TDM cycle after TDM cycle.

The MAC controller 420 is responsible for implementing the MAC synchronization process both to determine the starts of speech times (the generation of the signal Tx_cycle_event 451) and to generate the signal representing the network cycle starts for the slave nodes (signal SF_slave_cycle_start 524). The signal Tx_cycle_event 451 indicates the instant from which the node can transmit or send on the network, following the instant at which the node preceding it in the transmission sequence has ceased to transmit, to which a waiting time interval (or gap) is added to enable the reorientation of the antennas and compensate for the jitter inherent in the wireless network 101. It must be noted that, in the case of the master node, the generation of the signal representing the network cycle starts is the signal SF_master_cycle and that it is generated by the TDM bus manager 414.

The MAC controller 420 also checks the orientation of the antenna 112 in reception by means of a signal Antenna_Ctrl 455. It is considered to be the case here, in a particular mode of implementation of the meshed network 101, that the nodes orient their radio antennas in reception and use their antenna in omnidirectional mode in transmission, in order to make sure that all the nodes receive the information broadcast by the transmitter node while at the same time limiting the power needed for the transmission of the radio signal.

An RF (radiofrequency) transmit module 434 performs the usual functions of a radio transmitter: conversion of the intermediate frequency at output of the modulator 425 into the frequency of the carrier used by the radio transmissions (conversion into high frequency), amplification, sending through an antenna etc.

An RF (radiofrequency) receiver module 434 performs the usual functions of a radio receiver: reception via an antenna, filtering, detection of level, automatic gain control, conversion into low frequency, etc.

FIG. 5 shows an example of architecture of the MAC adapter 428 according to the particular embodiment of the invention.

The MAC adapter 428 comprises:
a four-port memory 500 (for example of the RAM or "Random Access Memory" type) in which the chunks are stored:
a transmission chunk manager (Tx_chunk management) module 505 which reads the virtual channels of the TDM bus of the SyncTF_to_MAC FIFO 419, generated at each cycle, and arranges them in the memory 500. This transmission chunk manager module 505 interfaces with the memory 500 by means of a register RefBaseAddrRegister 504 which is a modulo 2 counter that points successively at the three different zones of the memory 500, as described here below with reference to FIG. 10. The register RefBaseAddr 504 is incremented at each SF_cycle_start signal 512. It always makes reference to a memory zone in which the next super frame is being built.
a module for transmission to the MAX layer (Tx_To_MAC) 506, which is in charge of building MAC frames of the local node when the instant of transmission is reached, the instant of transmission being given by the signal Tx_cycle_event 513. the module of transmission to the MAC layer 506 addresses the memory 500 through a register TxToMacBaseAddr 503. This register 503 addresses alternately the zone of the current super frame and the zone of the previous super frame, for the building of the MAC frames;

a module of reception from the MAC layer (Rx_From_MAC) 507, which is in charge of receiving the MAC frames and processing the own data and repeated data sections of the frame. It addresses the memory 500 through a register RxFromMacBaseAddr 502;

a module of reception to the TDM bus (Rx_To_TDM) 508, which take responsibility for extracting the virtual channels from the previously received super frame and sending them to the FIFO SyncRF_From_MAC 417, in a TDM order (virtual channel by virtual channel, not chunk by chunk). It interfaces with the memory 500 through the register RxToTDMBaseAddr;

a register Chunk_flags 509, which contains a presence indicator for each chunk stored in the memory 500.

retransmit matrix 510 which indicates the chunks 3 transmitted for all the nodes of the network. For each node, this matrix indicates the numbers of the chunks to be placed in the repeat data section 315 of the MAC frame. It also indicates, for each chunk, whether it should be taken in the current super frame or in the previous super frame;

a Mux_demux register 511, which indicates the chunks transmitted for all the nodes of the network. For each node, this register indicates the numbers of the chunks as to be placed in the own data section 314 of the MAC frame. This register can be called a virtual channel allocation matrix.

Figure 6:
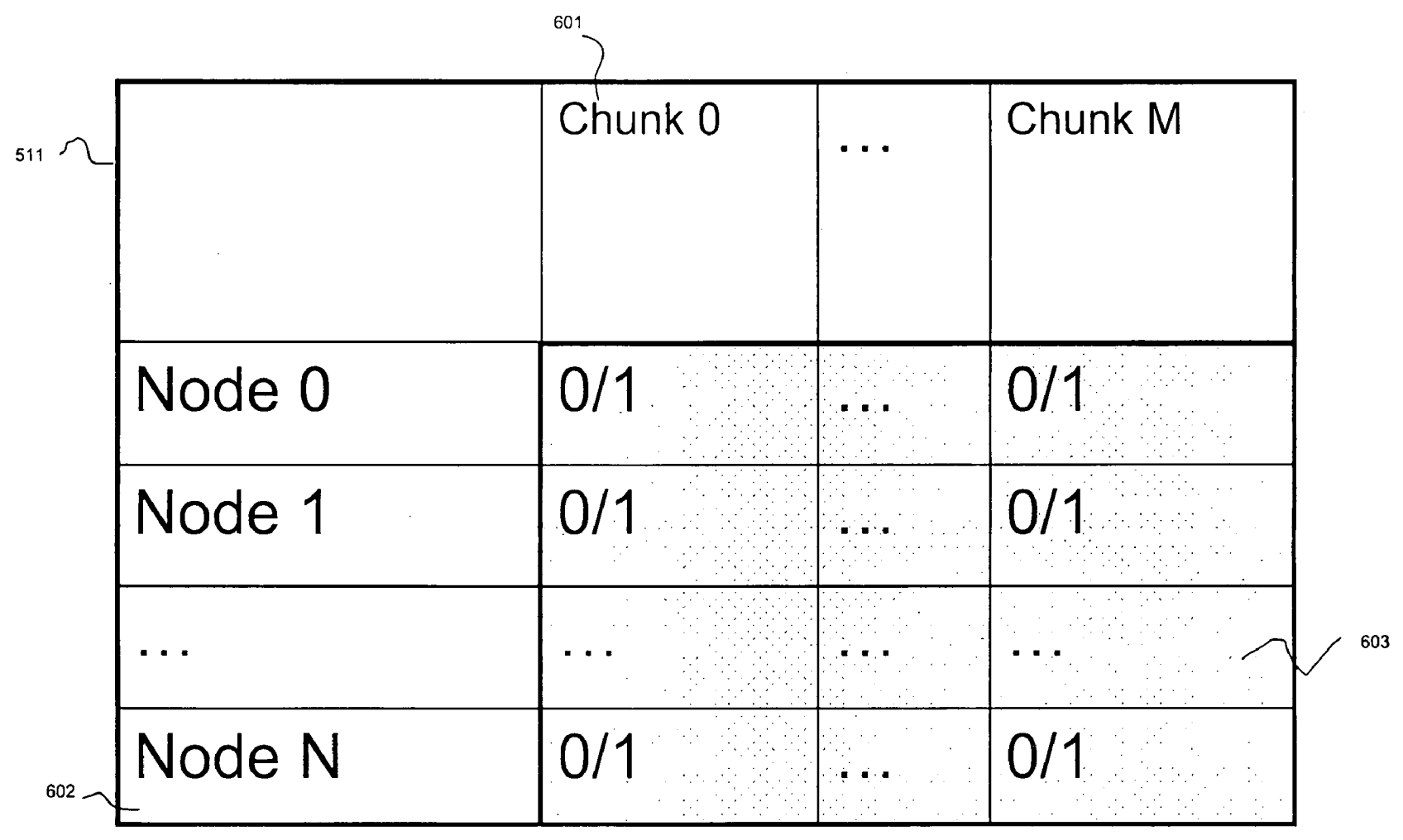

FIG. 6 shows an example of an architecture of the register mux_demux 511 according to a particular embodiment of the invention. The register mux_demux 511 indicates the content of the own data section of the MAC frame of each node. The register is addressed by rows 602 and by columns 601. Each row corresponds to a node identifier (Node 0 to Node N), and each: corresponds to a chunk number (chunk 0 to chunk M). The values stored 603 are 1 or 0:

the value 1 means that the chunk must be transmitted, and
the value 0 tells us that the chunk should not be transmitted.

Figure 7:
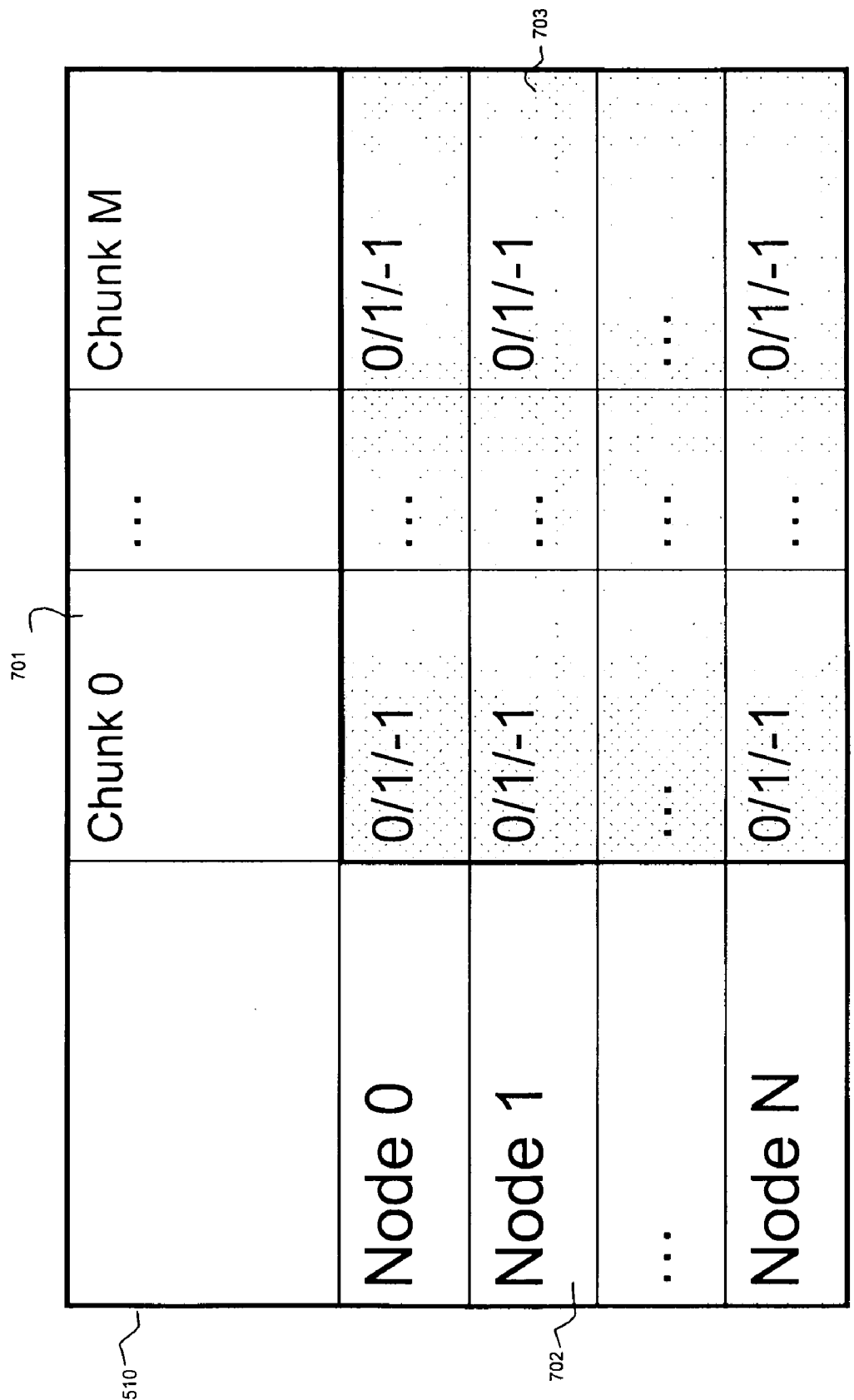
FIG. 7 shows an example of an architecture of the retransmit matrix, shown in FIG. 5, according to a particular embodiment of the invention.

FIG. 7 presents an example of architecture of the retransmit matrix 510 according to a particular embodiment of the invention. The retransmit matrix 510 has predetermined values corresponding to a default behavior. These values are stored in a ROM and loaded into the RAM when the system is started. The retransmit matrix by 10 indicates the content of the repeated data section of the MAC frame of each node. It is addressed by rows 702 and by columns 701. Each row corresponds to a node identifier (Node 0 to Node N), and each column corresponds to a chunk number (chunk 0 to chunk M). The stored values (parameter t) 703 are 1, 0 or −1:

the value 1 means that the chunk does not have to be retransmitted,
the value 0 means that the chunk received preliminarily and belonging to the current super frame must be transmitted, and
the value −1 indicates that the chunk preliminarily received and belonging to the previous super frame must be retransmitted.

The retransmit matrix 510 (described in FIG. 7) and the register mux_demux 511 (also called here below <<virtual channel allocation matrix>>) (described in FIG. 6) contains predefined values. The retransmit matrix 510 describes the content of the repeat data section of the MAC frames (packets) sent out by each node while the allocation matrix 511 describes the own data section of the MAC frames (packets) sent out by each node. The combined content of these two matrices are stored in a ROM and are loaded when the system is started up. Then advantageously it is planned to have a service interface through which an installer of such a system can change the default value of these parameters in order to place values better suited to the particular conditions of a given installation. Indeed, it may be advantageous to repeat the data coming from a particular node more often because it would be considered to be more important or less well placed in terms of radio range or for any other consideration. An installer could also take advantage of particularly advantageous radio conditions to decide to reduce the number of pieces of retransmission data and thus gain in terms of bit rate for the own data.

Figure 8:
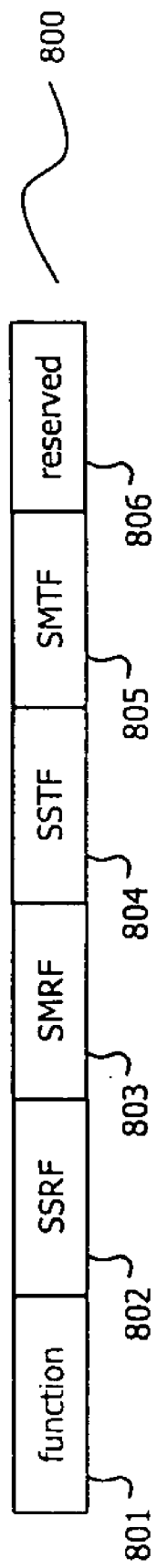
FIG. 8 shows an example of an architecture of a TDM distribution register, seen in FIG. 4, according to a particular embodiment of the invention.

FIG. 8 shows an example of architecture of the TDM distribution register TDM_MAP 415 according to a particular embodiment of the invention.

The TDM map register TDM_MAP 415 comprises a 32-bit memory zone for each virtual channel.

The pieces of data in the TDM map register TDM_MAP 415 are ordered according to the numbering of the virtual channels given: at the first offset address aligned on 32 bits of the register, there is the memory zone corresponding to the virtual channel 0 and at the nth offset address aligned on 32 bits of the register, there is the memory zone corresponding to the virtual channel n.

The memory zone 800 of a given virtual channel comprises six fields:

a <<function>> field 801 which comprises two bits and identifies the nature of the virtual channel, for example b00 means "virtual channel" in read mode, b01 means "virtual channel in write mode" and b1x means "unused virtual channel";

an "SSRF" field 802 which comprises six bits and identifies the SSRF FIFO which is associated with the virtual channel, for example b000000 means that it is the FIFO SSRF[0], b000001 means that it is the FIFO SSRF[1], and b111111 means that no SSRF FIFO is associated with the virtual channel;

an "SMRF>>" field 803 which comprises six bits and identifies the SMRF FIFO that is associated with the virtual channel, for example b000000 means that it is the FIFO SMRF[0], b000001 means that it is the FIFO SMRF[1], and b111111 means that no SMRF FIFO is associated with the virtual channel;

an "SSTF" field 804 which comprises six bits and identifies the SSTF FIFO which is associated with the virtual channel, for example b000000 means that it is the FIFO SSTF[0], b000001 means that it is the FIFO SSTF[1], and b111111 means that no FIFO SSTF is associated with the virtual channel;

an "SMTF" field 805 which comprises six bits and identifies the SMTF which is associated with the virtual channel, for example, b000000 means that it is the FIFO SMTF[0], b000001 means that it is the FIFO SMTF[1], and b111111 means that no SMTF FIFO is associated with the virtual channel.

A "reserved" field 806 comprising six bits which are reserved for any forthcoming application.

Figure 9:
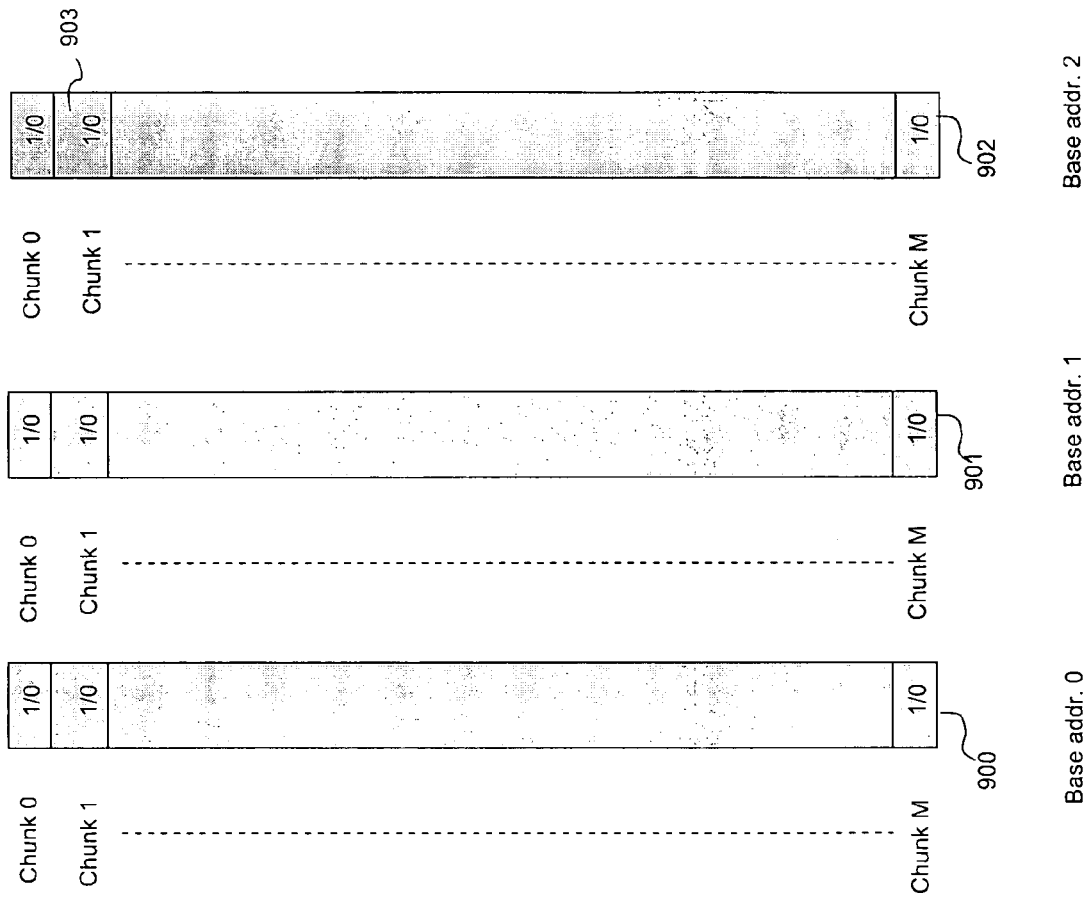
FIG. 9 shows an example of architecture of the Chunk_flags, register shown in FIG. 5, according to a particular embodiment of the invention.

FIG. 9 shows an example of architecture of the Chunk_flags register 509 according to a particular embodiment of the invention.

The Chunk_flags register 509 indicates the presence or non-presence of a valid chunk in memory. This is a three-bank memory of M chunks (chunk 0 to chunk M), each bank 900, 901 and 902 corresponding to a memory zone. The possible values 903 are 1 and 0. The value 1 indicates the presence of a valid chunk and the value 0 indicates the absence of a valid chunk.

Figure 10:
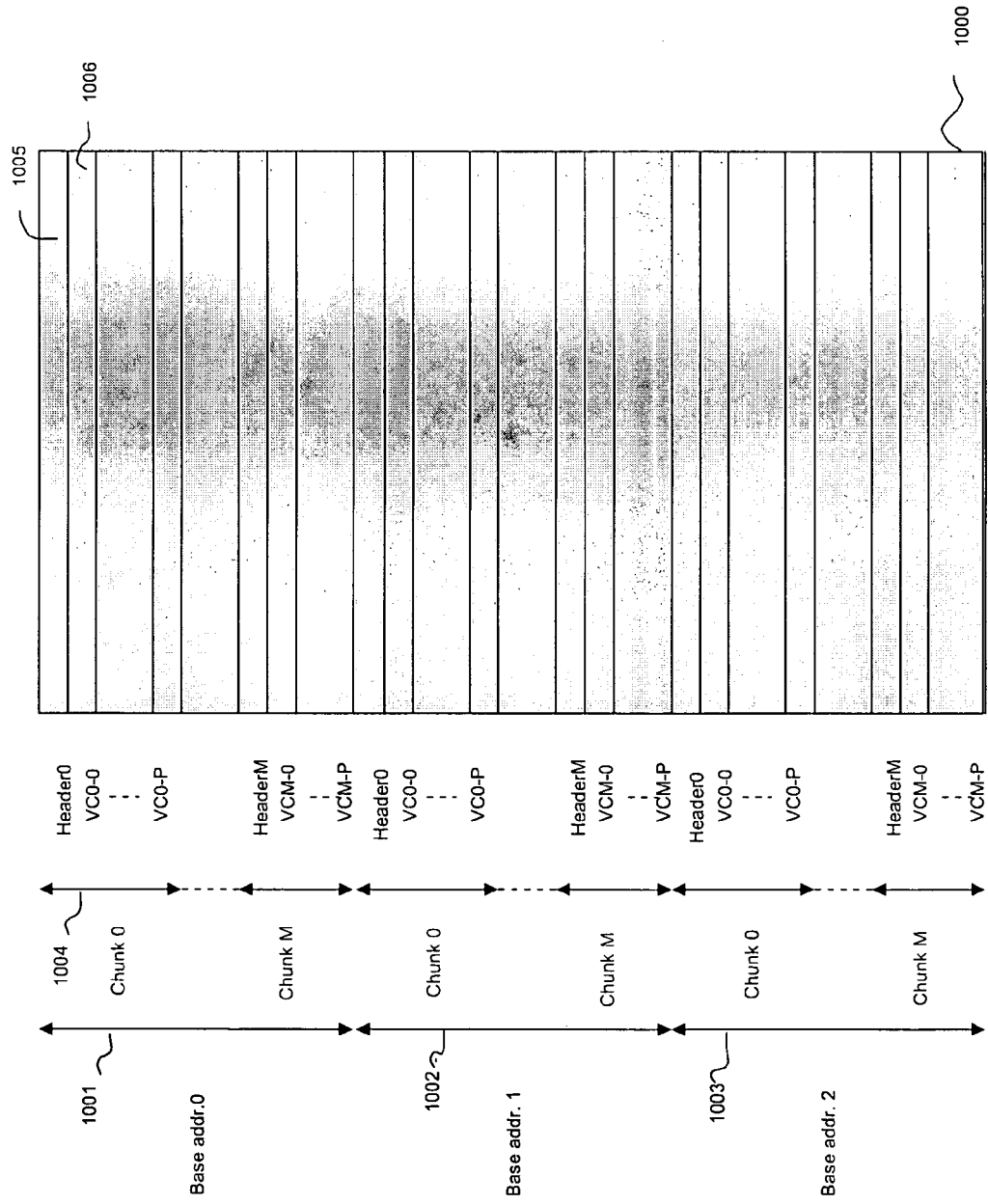
FIG. 10 shows an example of an architecture of the memory, shown in FIG. 5, according to a particular embodiment of the invention.

FIG. 10 shows an example of architecture of the memory 500 according to a particular embodiment of the invention.

The memory 500 is formed by three zones 1001, 1002 and 1003, each associated with a base address (base address 0 for the zone 1001, base address 1 for the zone 1002 and base address 2 for the zone 1003).

Each zone corresponds to a super frame (i.e. to a network cycle; see FIG. 3). The zones are addressed each in turn (in a round robin type distribution) so that each zone corresponds alternately to the next (T=1), current (T) or preceding (T−1) super frame.

Each zone contains a maximum number M of chunks per super frame. This number M also corresponds to a maximum number of virtual channels (VC0 to VCM) per TDM cycle. Each chunk 1004 (chunk 0 to chunk M) is formed by a header 1005 and a concatenation of P+1 successive values of a same virtual channel 1006) for example the successive values VC0-0 to VC0-P of the virtual channel VC0, for the chunk Chunk of 0). P+1 is the number of TDM cycles per network cycle. For example, the chunk number k comprises the value VCk-0 of the virtual channel number k (VCk) during the first TDM cycle, the value VCk-1 of the virtual channel number k (VCk) during the second TDM cycle . . . up to the value VCk-P of the virtual channel number k (VCk) during the last TDM cycle of a same network cycle. The size of a value of a virtual channel is 48 bits. The header 1005 has one bit per virtual channel. If this bit is at 1 it means that there is no data in the virtual channel, if it is at 0 it means that there is a padding chunk or a "zero" symbol in the chunk.

There is only one known symbol which is the padding chunks, encoded 0x555555. This symbol is used to indicate that a chunk which should have been stored in the memory is not present therein. It is inserted when, after the last node (as defined in the retransmit matrix 510) has spoken on the network, the data are not received (and there is no longer any chance of receiving them).

Each zone of the memory 500 can contain all the virtual channels of the duration of a network cycle (each zone corresponds to a super frame). The channels are ordered as a function of their chunk number, from the smallest chunk number to the biggest chunk number (chunk 0 to chunk M). The virtual channels are ordered according to their number, from the smallest to the biggest virtual channel number (VC0 to VCM).

At each network cycle, a specific task is assigned to each zone of the memory 500. For example, if for a given network cycle:

the first zone is used to process chunks coming from the TDM bus (data associated with the network cycle C for example);

the second zone is used to transmit chunks to or receive chunks from the meshed network 101 (data associated with the network cycle C-1).

the third zone is used to carry out the disassembly of chunks and the extraction of virtual channels to the TDM bus (data associated with the network cycle C-2).

then, during the next network cycle:

the first zone is used for the transmission of chunks to the reception of chunks from the meshed network 101;

the second zone is used to carry out the disassembling of chunks and extraction of virtual channels toward the TDM bus;

the third zone is used to process chunks coming from the TDM bus.

The register RefBaseAddr 504 successively selects the three base addresses of the memory 500 in the following order: base address 2, base address 1 and base address 0. The change in value of the base address is activated by the reception of the signal SF_cycle_start, as described here above.

Figure 11:
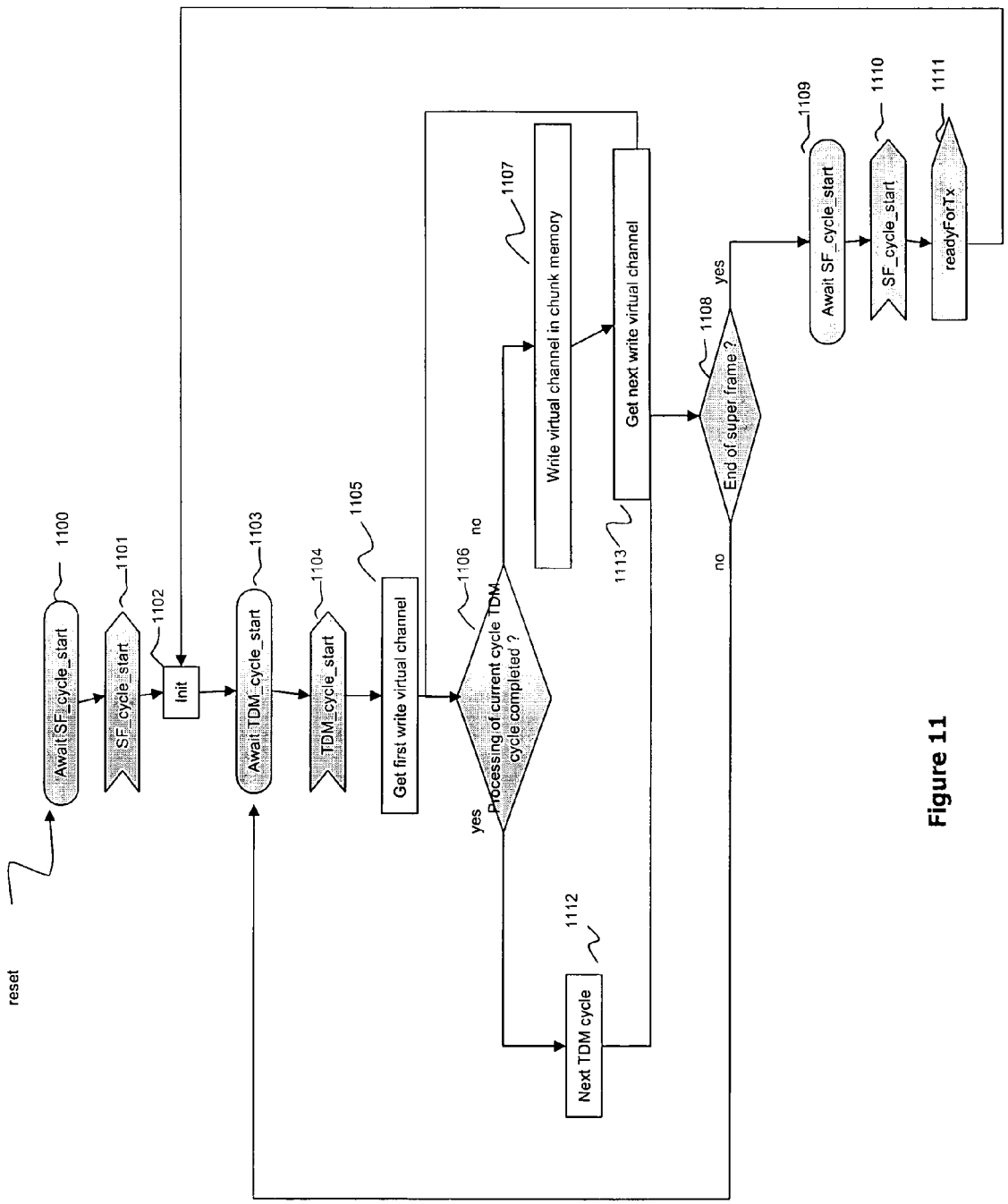
FIG. 11 shows the main steps of a processing algorithm implemented by the chunk management module in transmission, included in the MAC adapter and shown in FIG. 5, according to a particular embodiment of the invention.

FIG. 11 presents the main steps of a processing algorithm implemented by a transmission chunk management module (Tx_Chunk_Management) 505, included in the MAC adapter 428 according to a particular embodiment of the invention.

This module 505 has the function of obtaining virtual channels at each TDM cycle from the FIFO SyncTF_to_MAC 419, and of arranging them into chunks 1004 in the memory 500. This module 505 always addresses the memory 500 in the zone corresponding to the next super frame. This is done by means of the register RefBaseAddr 504. This base address register is incremented modulo 2 at each new super frame.

After reset, in a step 1100, a signal (also called an event) SF_cycle_start 512 is awaited. This signal indicates the start of a new super frame (i.e. the start of a new network cycle).

In a step 1101, the signal SF_cycle_start 512 is received.

In a step 1102, an internal variable TDM_cycle is set at 0. This internal variable counts the TDM cycles during the super frame. The register Chunk_flags 509 which corresponds to the register RefBaseAddr 504 is reset, the register RefBaseAddr 504 pointing to the next super frame in memory 500.

In a step 1103, there a signal TDM_cycle_start 514 is awaited. This signal indicates the start of a new TDM cycle.

In a step 1104, the signal TDM_cycle_start 514 is received.

In a step 1105, a search is made for the first write-allocated virtual channel for the local node. This is done in reading the "function" field 801 of the register TDM_MAP 415. If such a virtual channel is found, its number is stored in an internal variable VCnum. If not, the value −1 is stored in the variable VCnum.

In a step 1106, a test is made to see if a write-allocated virtual channel has been found. If yes, the operation passes to the step 1107. If the answer is negative, it means that the processing of the current TDM cycle is completed and the operation passes to the step 1112.

In the step 1107, the data of the virtual channel is written in the chunk memory. To this end, the virtual channel data is read from the FIFO SyncTF_to_MAC 419, and the data is written in the memory, in the zone indicated by the register RefBaseAddr 504. Then, the chunk header in the memory is updated to indicate the nature of the virtual channel stored.

Then, in a step 1113, a search is made for the next write-allocated virtual channel, in reading the "function" field 801 of the register TDM_MAP 415. Then, there is a return to the step 1106.

In a step 1112, the processing of a TDM cycle is terminated and the variable TDM_cycle is incremented.

In a step 1108, a test is made to see if the last TDM cycle of the super frame has been reached. If not, there is a return to the step 1103 for a new TDM cycle. If yes, the operation passes to the step 1109 for a new network cycle (i.e. for a new super frame).

In the step 1109, the signal SF_cycle_start 512 (i.e. the start of the new super frame) is awaited.

In the step 1110, the signal SF_cycle_start 512 is received.

In a step 1111, a signal readyForTx 515 is sent to the transmission module towards a MAC layer (Tx_To_MAC) 506, then the step 1102 is returned to. The previous super frame is ready to be sent by the MAC adapter 428, i.e. the pieces of data are ready and when the MAC synchronization module 403 is ready, the next super frame will be sent.

Figure 12:
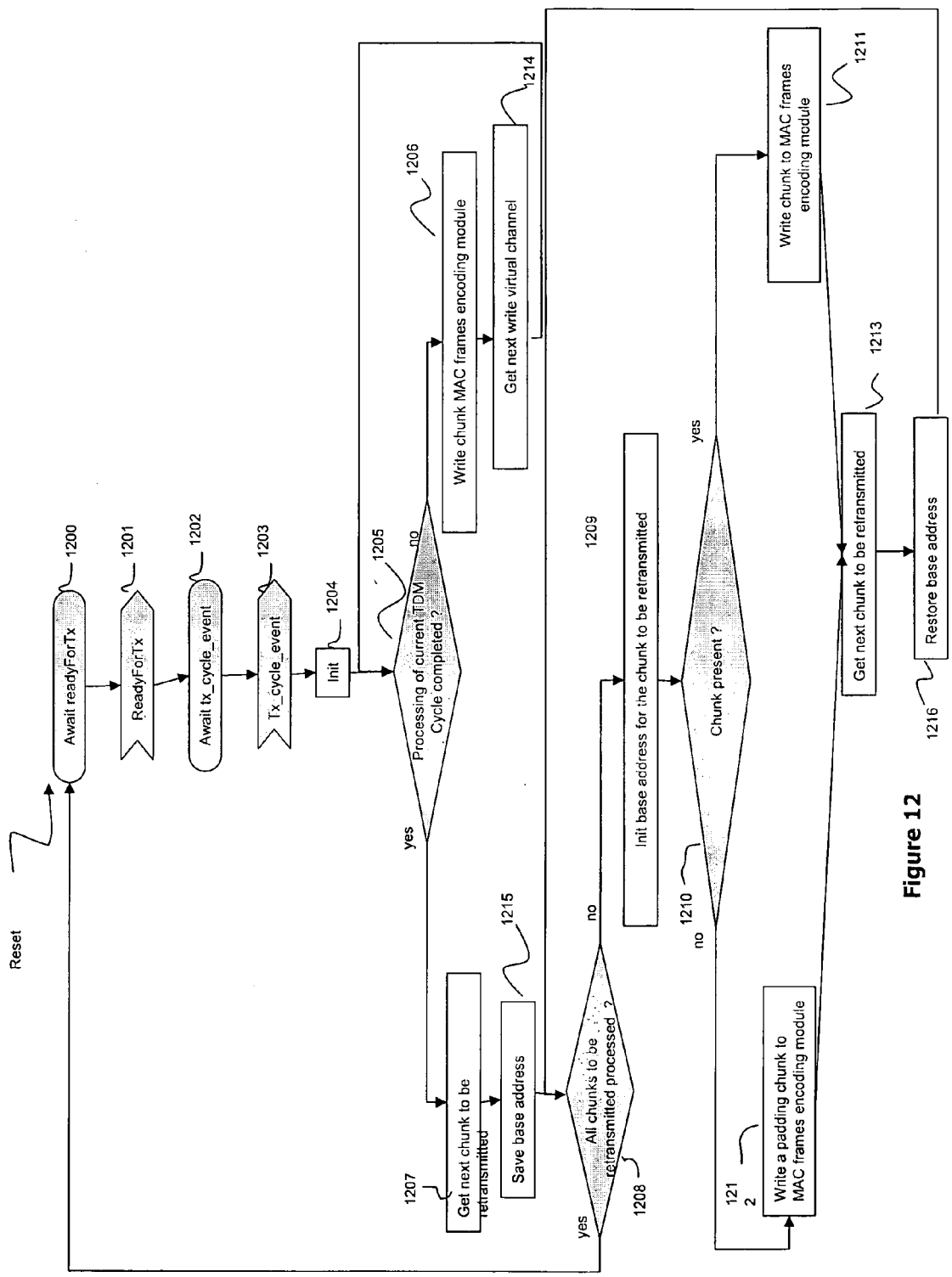
FIG. 12 shows the main steps of a processing algorithm implemented by the module of transmission to the MAC layer included in the MAC adapter and shown in FIG. 5, according to a particular embodiment of the invention.

FIG. 12 shows the main steps of a processing algorithm implemented by the model of transmission to the MAC layer (Tx_To_MAC) 506, included in the MAC adapter 428, according to a particular embodiment of the invention.

This module 506 has the function, once the transmission chunk management module (Tx_Chunk_Management) 505 has prepared the chunks for the current super frame, of sending them to the MAC frame encoding module 424 as an own data section. It also takes chunks from the current super frame and the previous super frame to send them to the MAC frame encoding module 424 as a repeat data section.

After reset, there is a wait in a step 1200 for the signal readyForTx generated by the transmission chunk management module (Tx_Chunk_Management) 505 (cf. FIG. 11, step 1111).

In a step 1201, the signal readyForTx is received.

In a step 1202, the signal Tx_cycle_event 513 is awaited. This signal is generated by the MAC synchronization module 403 when it is ready to send a MAC frame.

In a step 1203, the signal Tx_cycle_event is received.

In a step 1204, a search is made for the first write-allocated virtual channel for the local node. This is done in reading the <<function>> field 801 of the register TDM_MAP 415. If a virtual channel of this kind is found, its number is stored in an internal variable VCnum, if not the value −1 is stored in the variable VCnum. This variable VCnum also indicates the number of the chunk to be read in the memory 500. Furthermore, in this step 1204, the register TxToMacBaseAddr 503 is set with the content of the register RefBaseAddr 504, to address the memory 500 in the zone of the current super frame.

In a step 1205, a test is made to see whether a write-allocated virtual channel has been found, i.e. whether the variable VCnum is valid (!=−1). If the answer is yes, the operation passes to the step 1206. If not, it means that the processing of the current TDM cycle is ended (all the write-allocated virtual channels have been processed). Hence, the processing of the own data section of the super frame has been finished and the operation passes to the step 1207 for the processing of the repeat data section.

In the step 1206, the chunk corresponding to VCnum is read in memory 500. Then, this chunk is written to the MAC frame encoding module 424, then in the step 1214, a search is made for the next write-allocated virtual channel and the operation returns to the step 1205.

In the step 1207, a search is made for the first chunk that is to be transmitted, in the retransmit matrix 510, and then in the step 1215, the value of the register TxToMacBaseAddr 503, which is pointing to the current super frame, is saved.

In the step 1208, a test is made to find out if all the chunks that are to be retransmitted have been processed. If yes, it means that the processing of the MAC frame repeat data section is terminated and there is a return to the step 1200. If not, the operation passes to the step 1209 to continue the processing of the MAC frame repeat data section.

In the step 1209, the register TxToMacBaseAddr 503 is modified as a function of the timing information (i.e. current super frame or preceding super frame) in the retransmit matrix 510. Thus, either the current super frame or the previous super frame will be addressed.

In a step 1210, a test is made to see the chunk is effectively present in the memory. If certain frames are not received, owing to problems such as shadowing, chunks may be missing in the memory 500. The test is made on the register Chunk_flags 509. If the chunk is present, the operation passes to the step 1211. If not, the operation passes to the step 1212.

In the step 1211, the chunk is read in the memory 500 and written to the MAC frame encoding module 424.

In the step 1212, a padding chunk is written to the MAC frame encoding module 424. A padding chunk is a chunk with a header at 0 and all its virtual channels encoded with the value of the padding chunk symbol Ox555555.

In the step 1213, a search is made for the next chunk to be retransmitted in the retransmit matrix 510 and in the step 1216, the register TxToMacBaseAddr 503 is restored for the current super frame and the operation returns to the step 1208.

FIG. 13 presents the main steps of a processing algorithm implemented by the module of reception from the MAC layer (Rx_From_MAC) 507, included in the MAC adapter 428, according to a particular embodiment of the invention.

This module 507 has the function of receiving MAC frames coming from the MAC frame decoder 423 and of processing the data of the own data section and those of the repeat data section.

After reset, a step 1300 the signal 512 is awaited. This signal indicates the start of a new super frame (i.e. the start of a new network cycle).

In a step 1301, the signal SF_cycle_start 512 is received.

In a step 1302, the signal HOP_frame_Rx_event is awaited (cf. FIG. 4), this signal indicates the reception of a new MAC frame.

In a step 1303, the signal HOP_frame_Rx_event is received.

In a step 1304, a search is made for the first chunks sent in the own data section of the MAC frame of the transmit node. This information is available in the mux_demux register 511. Then, the register RxFromMacBaseAddr 502 is set with the content of the register RefBaseAddr 504, to address the memory 500 in the zone of the current super frame.

In a step 1305, a test is made to see if the processing of the old data section of the received MAC frame has been ended. If yes, the operation passes to the step 1307 to process the repeat data section. If not, the operation passes to the step 1306 to continue the processing of the own data section.

In the step 1306, the chunk coming from the MAC frame decoder 423 is read and written to the memory 500. Then, a 1 is written in the register Chunk_flags 509 to indicate a valid chunk. Then, in a step 1314, a search is made for the next chunk sent in the own data section of the received MAC frame. This information is available in the register mux_demux 511. Then the operation returns to the step 1305.

In the step 1307, a search is made for the first chunk retransmitted in the repeat data section of the received MAC frame. This information is available in the retransmit matrix 510.

In a step 1308, a test is made to see if the processing of the repeat data section of the received MAC frame has been ended. If yes, the operation returns to the step 1302. If not, the operation passes to the step 1309 to continue the processing of the repeat data section.

In the step 1309, the register RxFromMacBaseAddr 502 is modified as a function of the timing information (i.e. <<current super frame>> or "preceding super frame") contained in the retransmit matrix 510. Then, either the current super frame or the preceding super frame will be addressed.

In the step 1310, a check is made in the register registre Chunk_flags 509 to see if this chunk has not already been stored in processing another received MAC frame. If this is the case, the operation passes to the step 1313. There is no need to store the chunk again. If not, the operation passes to the step 1311.

In the step 1311, a test is made to see if the received chunk is encoded as a padding chunk, according to the above definition. If it is such a chunk, it is not necessary to store it (if another copy of the chunk is received from another node then it will be stored), and the operation passes to the step 1313. If it is not a padding chunk, the operation passes to the step 1312.

In the step 1312, the chunk is written to the memory 500. Then, a 1 is written to the register Chunk_flags 509 to indicate a valid chunk.

In the step 1313, a search is made for the next chunk sent in the repeat data section of the received MAC frame. This information is available in the retransmit matrix 510. Then, the operation returns to the step 1308.

It must be noted that, in the particular embodiment described here above of the processing algorithm implemented by the module of reception from the MAC layer (Rx_From_MAC) 507, the first copy received of a particular chunk is kept systematically. This is illustrated in the step 1310 where a test is made to see if a first copy of the chunk has not already been stored. If there is already a first copy, the second copy is not processed.

In one variant of an embodiment, it is possible to advantageously improve the choice of the chunk copy to be kept for the retransmission of data to another node (data relay). A possible improvement consists in comparing the respective quality of the two copies presented and of keeping only the better one rather than systematically keeping the first one received. One way to evaluate the quality of the chunk may be implemented through the use of error detection code known to those skilled in the art such as the CRC (<<Cyclic Redundancy Check>>, or other parity bit. It is also possible, when the device has a Reed Solomon type erasure decoder to determine the Reed Solomon syndrome (low-cost as compared with a full decoding of data) and from this syndrome to evaluate the quality of the copies of the chunk copies received. In this case, it is considered that the comparison relates to the presence or non-presence of the chunk copy.

FIG. 14 presents the main steps of a processing algorithm implemented by the reception module to the TDM bus (Rx_To_TDM) 508, included in the MAC adapter 428, according to a particular embodiment of the invention.

This module 508 has the function of reading the virtual channels in the zone of the memory 500 reserved for the preceding super frame.

After reset, a step 1400 the signal SF_cycle_start 512 is awaited. This signal indicates the start of a new super frame (i.e. the start of a new network cycle).

In a step 1401, the signal SF_cycle_start 512 is received.

In a step 1402, an internal variable TDM_cycle is set at zero. This internal variable counts the TDM cycles during the super frame. Then, the register RxtoTDMBaseAddr 501 is reset with the content of the register RefBaseAddr 504, to address the memory 500 in the zone of the preceding super frame.

In a step 1403, an internal variable <<I>> is placed at 0.

In a step 1404, a test is made to see if the variable <<I>> represents a write-allocated virtual channel number. This is done in reading the "function" field 801 of the register TDM_MAP 415. If the answer is negative, the operation passes to the step 1411. If the answer is yes, the operation passes to the step 1405.

In the step 1405, a test is made to see if there is a valid chunk for this virtual channel. This information is given by the register Chunk_flags 509. If no valid container is available, a padding chunk is written to the FIFO SyncRF_from_MAC 417, in the step 1406. If there is a valid chunk, the operation passes to the step 1407.

In the step 1407, the virtual channel is read in the memory 500, and it is written to FIFO SyncRF_from_MAC 417.

In the step 1411, the local variable <<I>> is incremented.

In the step 1408, a check is made to see if all the virtual channels have been processed. If the answer is negative, the operation returns to the step 1404. If the operation is positive, the operation passes to the step 1409.

In the step 1409, the local variable TDM_cycle is incremented.

In the step 1410, a test is made to see if the end of the super frame has been reached (i.e. if all the TDM cycles of the super frame has been processed) if the answer is negative, the operation returns to the step 1403. If it is yes, the operation returns to the step 1400.

The invention claimed is:

1. A method of transmitting data in a synchronous communications network that includes a plurality of nodes, wherein a super frame is communicated based on a network cycle on the network and includes a plurality of frames, wherein each frame is associated with one of the nodes and includes a payload part that includes an own data section and a repeat data section, wherein the plurality of nodes include at least one relay node associated with an application generating own data of the relay node to be transmitted to at least one destination node, and wherein the method is performed by the relay node, the method comprising steps of:
    receiving frames from other of the nodes;
    reading a predetermined part of data from the received frames and obtaining repeat data;
    writing the repeat data in the repeat data section of a new frame; and
    writing the own data of the relay node in the own data section of the new frame; and
    transmitting the new frame.

2. The method according to claim 1 wherein, in the reading step, only a predetermined part of the data of the own data section of the received frames is read.

3. The method according to claim 1, wherein the reading step is performed as a function of a content of a transmit matrix that indicates a content of the own data section for each node.

4. The method according to claim 3, wherein the own data section of each frame includes a predetermined number of data blocks called chunks and wherein, for each node, the transmit matrix indicates for each chunk rank i, with i∈[1, M], i and M being integers and M being a maximum number of chunks per super frame, whether:
    the chunk rank i should be transmitted in the own data section of a frame associated with the node, or
    the chunk rank i should not be transmitted in the own data section of the frame associated with the node.

5. The method according to claim 1, wherein the writing of the repeat data is performed as a function of a content of a retransmit matrix that indicates a content of the repeat data section for each node.

6. The method according to claim 5, wherein the own data section of each frame includes a predetermined number of blocks called chunks, and wherein, for each node, the retransmit matrix indicates, for each chunk rank i, with i ∈[1, M], i and M being integers and M being a maximum number of chunks per super frame, whether:
    the chunk rank i should not be retransmitted in the repeat data section of a frame associated with the node, or
    the chunk rank i should be retransmitted in the repeat data section of the frame associated with the node, in taking a chunk associated rank i and received in a current super frame, or the chunk rank i should be retransmitted in the repeat data section of the frame associated with the node, in taking a chunk associated with the rank i and received in a previous super frame.

7. The method according to claim 5, wherein, if a chunk to be retransmitted is missing because the chunk has not been read during the reading of the predetermined part of the data from the received frames, a padding chunk is written instead of the chunk in the repeat data section of the new frame.

8. The method according to claim 1, further comprising a step of storing the data of the frames received in a memory, wherein the reading of the predetermined part of the data from the received frames includes reading the repeat data in the memory.

9. The method according to claim 8, wherein each frame includes a predetermined number of data blocks called chunks and the storing of the data of the received frames includes, for each chunk of each frame:
- if the chunk is a first received copy, the chunk is stored in the memory;
- if the chunk is not the first received copy and is a second received copy, and, if the first received copy has already been stored, the second received copy is not stored in the memory.

10. The method according to claim 8, wherein each frame includes a predetermined number of data blocks called chunks and the storing of the data of the received frames includes, for each chunk of each frame:
- if the chunk is a first received copy, the chunk is stored in the memory;
- if the chunk is not the first received copy and is the second received copy and, if the first received copy has already been stored, a quality of the first and second received copies is compared and one of the first and second received copies having a best quality according to at least one quality criterion is stored in the memory.

11. A non-transitory computer-readable storage medium storing a computer program that, when executed by a computer, cause the computer to perform a method of transmitting data in a synchronous communications network including a plurality of nodes, wherein a super frame that includes a plurality of frames is communicated based on a network cycle on the network, wherein each frame is associated with one of the nodes and includes a payload part that includes an own data section and a repeat data section, wherein the plurality of nodes include at least one relay node associated with an application generating own data of the relay node to be transmitted to at least one destination node, and wherein the method is performed by the relay node, the method comprising steps of:
- receiving frames from other of the nodes;
- reading a predetermined part of data from the received frames and obtaining repeat data;
- writing the repeat data in the repeat data section of a new frame; and
- writing the own data of the relay node in the own data section of the new frame; and
- transmitting the new frame.

12. A relay node included in a plurality of nodes in a synchronous communications network, wherein a super frame that includes a plurality of frames is communicated based on a network cycle on the network, each frame being associated with one of the nodes, the plurality of nodes including at least one first sender node associated with a first generator application generating own data of the first sender node to be transmitted to at least one first destination node, the relay node being associated with a second generator application generating own data of the relay node to be transmitted to at least one second destination node, the relay node comprising:
- means for receiving frames from other of the nodes, each frame including a payload part that includes an own data section and a repeat data section;
- means for reading a predetermined part of data from the received frames and obtaining repeat data;
- means for writing the repeat data in the repeat data section of a new frame;
- means for writing the own data of the relay node in the own data section of the new frame; and
- means for transmitting the new frame.

13. The relay node according to claim 12, wherein the means for reading reads only a predetermined part of the data of the own data section of the received frames.

14. The relay node according to claim 12, wherein the means for reading includes a transmit matrix that indicates a content of the own data section for each node.

15. The relay node according to claim 14, wherein the own data section of each frame includes a predetermined number of data blocks called chunks and, wherein, for each node, the transmit matrix indicates, for each chunk rank i, with i $\epsilon$[1, M], i and M being integers and M being a maximum number of chunks per super frame, whether:
- the chunk rank i should be transmitted in the own data section of a frame associated with the node, or
- the chunk rank i should not be transmitted in the own data section of the frame associated with the node.

16. The relay node according to claim 12, wherein the means for writing repeat data includes a retransmit matrix that indicates a content of the repeat data section for each node.

17. The relay node according to claim 16, wherein the own data section of each frame includes a predetermined number of blocks called chunks and, wherein, for each node, the retransmit matrix indicates, for each chunk rank i, with i $\epsilon$[1, M], wherein i and M being integers and M being a maximum number of chunks per super frame, whether:
- the chunk rank i should not be retransmitted in the repeat data section of a frame associated with the node, or
- the chunk rank i should be retransmitted in the repeat data section of the frame associated with the node, in taking a chunk associated with the rank i and received in a current super frame, or
- the chunk rank i should be retransmitted in the repeat data section of the frame associated with the node, in taking a chunk associated with the rank i and received in a previous super frame.

18. The relay node according to claim 16, wherein, if a chunk to be retransmitted is missing because the chunk has not been read by the means for reading, the means for writing repeat data writes a padding chunk instead of the chunk in the repeat data section of the new frame.

19. The relay node according to claim 12, further comprising means for storing data of the frames received in a memory, and wherein the means for reading reads the repeat data in the memory.

20. The relay node according to claim 19, wherein each frame includes a predetermined number of data blocks called chunks and the means for storing data of the frames received includes means for performing a storage policy, the storage policy including, for each chunk of each frame:
- if the chunk is a first received copy, the chunk is stored in the memory;

if the chunk is not first received copy and is a second received copy, and, if the first received copy has already been stored, the second received copy is not stored in the memory.

21. The relay node according to claim 19, wherein each frame includes a predetermined number of data blocks called chunks and the means for storing data of the frames received includes means for performing a storage policy, the storage policy including, for each chunk of each frame:

if the chunk is a first received copy, the chunk is stored in the memory;

if the chunk is not the first received copy and is a second received copy and, if the first received copy has already been stored, a quality of the first and second received copies is compared and one of the first and second received copies having a best quality according to at least one quality criterion is stored in the memory.

* * * * *